United States Patent [19]
McEwan

[11] Patent Number: 5,805,110
[45] Date of Patent: Sep. 8, 1998

[54] IMPULSE RADAR WITH SWEPT RANGE GATE

[75] Inventor: Thomas E. McEwan, Livermore, Calif.

[73] Assignee: The Regents of the University of California, Oakland, Calif.

[21] Appl. No.: 849,869
[22] PCT Filed: Dec. 19, 1995
[86] PCT No.: PCT/US95/16783
  § 371 Date: Jun. 17, 1997
  § 102(e) Date: Jun. 17, 1997
[87] PCT Pub. No.: WO96/19737
  PCT Pub. Date: Jun. 27, 1996

Related U.S. Application Data

[63] Continuation-in-part of Ser. No. 359,151, Dec. 19, 1994, abandoned, and Ser. No. 451,876, May 26, 1995, Pat. No. 5,774,091.

[51] Int. Cl.⁶ .............................. G01S 13/00; G01S 13/08; G01S 1/24
[52] U.S. Cl. .............................. 342/387; 342/22; 342/94; 342/126; 342/137
[58] Field of Search .................................. 342/22, 91, 94, 342/95, 124, 126, 128, 136, 137, 197, 387

[56] References Cited

U.S. PATENT DOCUMENTS

| | | | |
|---|---|---|---|
| 3,720,950 | 3/1973 | Vehrs, Jr. | 343/17.2 PC |
| 4,072,942 | 2/1978 | Alongi | 343/5 NA |
| 4,496,949 | 1/1985 | Bettini et al. | 343/7.7 |
| 4,698,634 | 10/1987 | Alongi et al. | 342/22 |
| 4,905,008 | 2/1990 | Kawano et al. | 343/22 |
| 5,115,242 | 5/1992 | Nagamune et al. | 342/124 |
| 5,276,453 | 1/1994 | Heymsfield | 342/112 |
| 5,422,647 | 6/1995 | Hirshfield | 342/354 |

Primary Examiner—Thomas H. Tarcza
Assistant Examiner—Dao L. Phan
Attorney, Agent, or Firm—Henry P. Sartorio

[57] ABSTRACT

A radar range finder and hidden object locator is based on ultra-wide band radar with a high resolution swept range gate. The device generates an equivalent time amplitude scan with a typical range of 4 inches to 20 feet, and an analog range resolution as limited by a jitter of on the order of 0.01 inches. A differential sampling receiver is employed to effectively eliminate ringing and other aberrations induced in the receiver by the near proximity of the transmit antenna (10), so a background subtraction is not needed, simplifying the circuitry while improving performance. Techniques are used to reduce clutter in the receive signal, such as decoupling the receive (24) and transmit cavities (22) by placing a space between them, using conductive or radiative damping elements on the cavities, and using terminating plates on the sides of the openings. The antennas can be arranged in a side-by-side parallel spaced apart configuration or in a coplanar opposed configuration which significantly reduces main bang coupling.

20 Claims, 12 Drawing Sheets

IMPULSE RADAR WITH SWEPT RANGE GATE

This application is a national stage application filed under 35 U.S.C. 371 of International Application PCT/US95/16783, filed Dec. 19, 1995, which claimed priority of U.S. application Ser. No. 08/359,151, filed Dec. 19, 1994, now abandoned, and U.S. application Ser. No. 08/451,876, filed May 26, 1995. This application is a Continuation-In-Part (CIP) of Ser. Nos. 08/359,151, now abandoned, and 08/451,876, now U.S. Pat. No. 5,774,091.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to high resolution, short range radar systems, and more particularly to ultra-wide band radars for imaging short range fields.

2. Description of Related Art

Short range finding applications in the prior art have typically been implemented using either ultrasound technology, or frequency modulated continuous wave (FMCW) radar. For instance, range finding used in fluid level sensors for large tanks in the prior art have involved FMCW radar level sensing. However, this technology, which relies on measuring changes in the beat frequencies detected for transmitted and received waves, requires very linear voltage controlled oscillators at microwave frequencies. This technology is very tough to implement with the precision desired in level sensing technology. Thus, prior art FMCW radars have been limited in resolution to several inches and are relatively expensive.

Another technology used in level sensing is ultrasound. However, ultrasound technology suffers a number of disadvantages. In particular, for fluid level sensors, the ultrasound may erroneously pick up a level of foam, rather than a level of actual liquid. Also, it does not penetrate vapors, like gasoline or steam, which may be trapped in a tank. Furthermore, any soil on the sensors will prevent its operation. Also, ultrasound is inherently difficult to use for precision measurements, because the speed of sound varies with temperature and humidity by as much as 10% in normal operating conditions.

Accordingly, it is desirable to provide a range finding system, or imaging system which operates over a short range, has low cost, and provides excellent accuracy.

SUMMARY OF THE INVENTION

The present invention provides a radar range finder and hidden object locator based on ultra-wide band radar with a high resolution swept range gate. The device generates an equivalent time amplitude scan with a typical range of 1 inch to 20 feet, and an analog range resolution as limited by a jitter of on the order of 0.01 inches. A differential sampling receiver is employed to effectively eliminate ringing and other aberrations induced in the receiver by the near proximity of the transmit antenna, so a background subtraction is not needed, simplifying the circuitry while improving performance. Uses of the invention include a replacement of ultrasound devices for fluid level sensing, automotive radar, such as cruise control and parking assistance. Also, this technology can be used when positioned over a highway lane to collect vehicle count and speed data for traffic control. Other uses include active suspension systems sensing, occupant position sensing, and other applications where the precise range to an object needs to be determined. The radar range finder makes an excellent fluid and solids level sensor for petroleum storage tanks, industrial mixing vats, and grain silos. Its amplitude display also indicates the presence or absence of objects located behind barriers, such as studs behind walls and rebar in concrete. The output can also be correlated with similar units at different spatial locations to provide synthetic beam forming for narrow beam applications and for imaging.

The invention can be characterized as an apparatus for detecting characteristics of objects within a field. The apparatus comprises a transmitter which transmits the sequence of electromagnetic pulses in response to a transmit timing signal. A receiver samples echoes of the sequence of electromagnetic pulses which are generated by objects within the field. The receiver samples these echoes using a differential sampling receiver having a transformerless differential input with high common mode rejection which reduces ground currents coupled from the transmit pulse through the apparatus structure.

According to one aspect of the invention, the receiver includes waveguide cavities for the transmit and receive antennas. The antennas comprise AC coupled monopoles with resistive loading formed within the respective cavities.

Means are included with the transmit and receive cavities for reducing clutter in the sample signal caused, for example, by ringing of the transmitted signal in the shield structures. The means for reducing clutter may be implemented by decoupling the shielded transmit cavity from the shielded receive cavity by a spacer, which may be empty or filled with dielectric material. Also, other techniques may be used to reduce ringing in the shielded receive cavity. Such techniques include using radiative conductors which extend toward the field being sensed from the perimeter of the shielded receive cavity and the shielded transmit cavity. Also, terminating plates may be placed around the opening on the shielded receive and transmit cavities. These plates may be flush with the plane of the opening in the cavity, or may lean toward the target field in order to provide some antenna gain for reflected signals. Another approach involves using a conductive damping element which is coupled to the perimeter of the opening in the receive cavity, such as at a corner in the opening and at a center of one side of the opening, and fashioned into a substantially triangular shape.

The receiver generates a sample signal which provides an equivalent time representation of the echoes being received. A timing circuit supplies the transmit timing signal to the transmitter and the receive timing signal to the receiver. The receive timing signal causes the receiver to sample the echoes such that the time between transmission of pulses in the sequence and sampling by the receiver sweeps over a range of delays. A sample detection circuit is responsive to the sample signal and the timing circuit to indicate a distance between the transmitter and the objects in the field from which the echoes are reflected.

The delay in the range of delays over which the timing circuit sweeps the time between transmission of pulses and sampling of the receiver defines the range of the device. According to the present invention, this range may vary by less than 300 nanoseconds, or more particularly by less than 10 nanoseconds in some systems. The time between pulses transmitted by the transmitter should be as long as or longer than the range of delays over which the sampling is swept.

Thus, the transmit timing signal causes the transmitter to transmit a sequence of electromagnetic pulses at a pulse repetition rate, and the receive timing signal sweeps over the range of delays in a sweep cycle such that echoes are sampled at the pulse repetition rate and with different delays in the range of delays. This produces a sample signal representing magnitude of the received echoes in equivalent time.

The pulse repetition rate may be, for example, greater than about 1 megaHertz, and the sweep rate less than about 16 kiloHertz, which is the frequency of NTSC video. More preferably, the sweep cycle may sweep at a sweep rate of less than 100 Hertz, for instance, 40 Hertz.

The receiver, according to another aspect of the invention, includes a receive antenna within a waveguide receive cavity. First and second diode sampling gates are mounted within the receive cavity and connected to the receive antenna. The diode sampling gates are pulsed by the receive timing signal, and feed the inputs of the differential amplifier. The output of the differential amplifier provides the sample signal in equivalent time. The antennas comprise AC coupled monopoles with resistive loading formed within the respective cavities.

In a side-by-side arrangement, the radiators or antenna elements in the cavities are in a spaced apart parallel configuration. In an alternate opposed embodiment, the radiators or antenna elements in the cavities are coplanar and extend in opposed directions. The opposed radiator arrangement is effective to reduce main bang coupling between the transmit antenna and receive antenna.

Accordingly, a wide band radar with high resolution, and having a swept range gate has been provided which operates in the near field. It overcomes all of the deficiencies of prior art ultrasound range finders, and is much more accurate and easier to implement than the FMCW radar used in these types of applications.

The present invention achieves an extraordinary level of ringing and close-in clutter suppression. At ranges further than four inches from the sensor, ringing and clutter are 30 dB lower than a strong return echo. Most prior art attempts to build close range, wide band radar result in just the opposite effect, that is, ringing and clutter are 30 dB stronger than the received echo, and a background subtraction technique had to be applied. Having to include a background subtract technology in the radar greatly reduces the dynamic range and stability, and complicates the circuitry.

Other aspects and advantages of the present invention can be seen upon review of the figures, the detailed description, and the claims which follow.

DETAILED DESCRIPTION OF PREFERRED EMBODIMENTS

Figure 1:
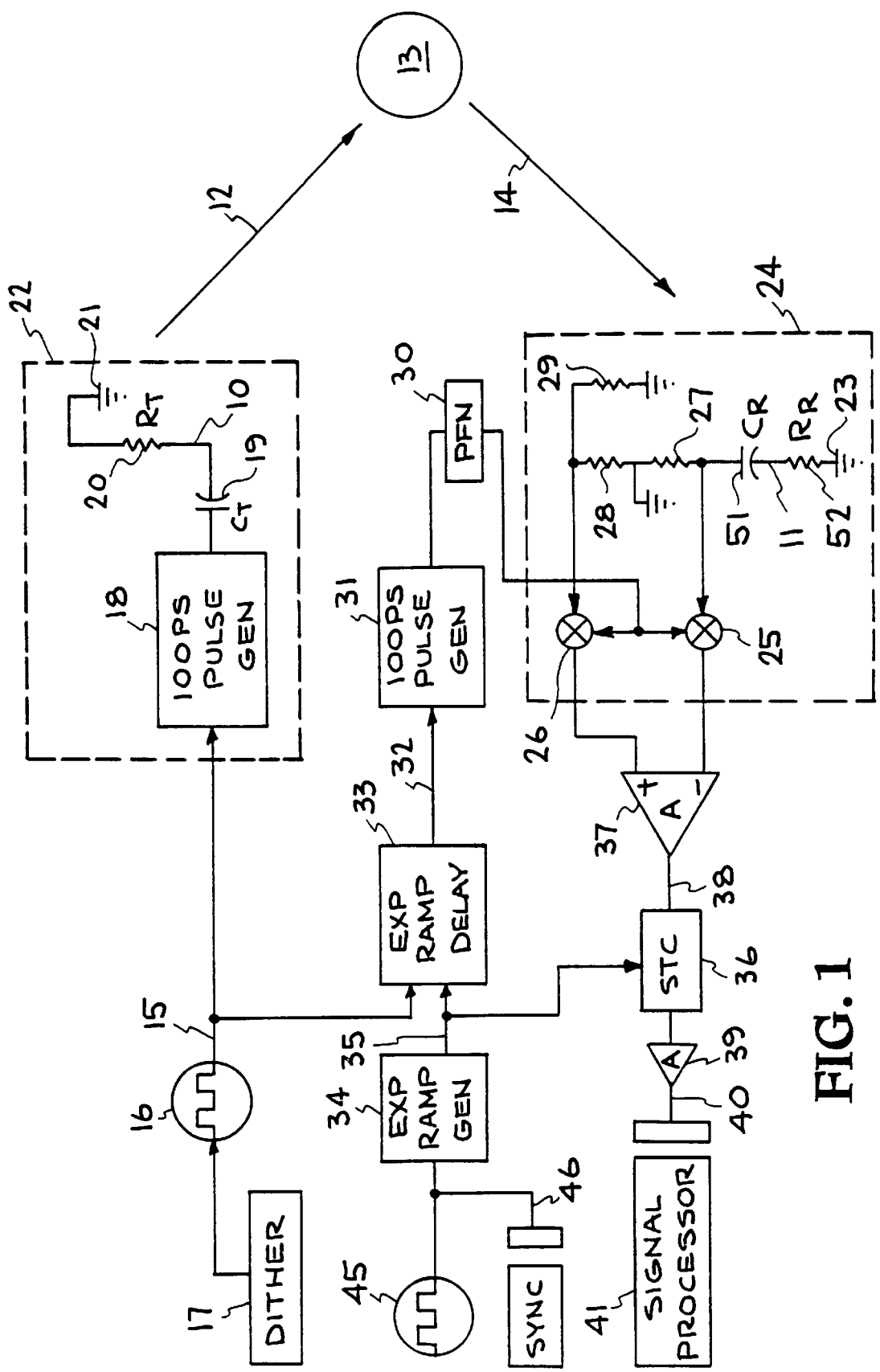
FIG. 1 is a block diagram of the wide band radar according to the present invention.

A detailed description of preferred embodiments of the present invention is provided with respect to the figures, in which FIG. 1 provides a block diagram of the sensor.

As can be seen in FIG. 1, the radar includes a one and one-quarter inch monopole antenna 10 for the transmitter, and a one and one-quarter inch monopole antenna 11 for the receiver. The transmit antenna is used to transmit a sequence of electromagnetic pulses, generally 12. Electromagnetic pulses echo off an object or target 13 within the field of the sensor. The echoes, generally 14, are received by the receive antenna 11.

The sequence of electromagnetic pulses are generated in response to a transmit clock on line 15. The transmit clock is supplied by a pulse repetition frequency generator 16, nominally at 2 megaHertz in this example. This pulse repetition frequency generator may be dithered using a dithering mechanism 17 if desired for noise immunity in the sensor. The transmit clock on line 15 drives a 100 picosecond pulse generator 18 (e.g. a transistor) which is coupled to the antenna 10 through a capacitor 19. The antenna 10 is a resistively loaded monopole antenna, having a transmit load resistor 20 coupled to a ground plane 21.

As schematically illustrated in the figure, the pulse generator 18 and antenna 10 are mounted within a waveguide cavity 22, providing shielding from other components on the sensor, and causing the electromagnetic pulses 12 to be issued in a forward direction, with limited back lobe generation.

The receive antenna 11 is coupled to a first high speed sample gate 25, and a second high speed sample gate 26. The antenna is connected from the input of the sample gate 25 to ground across a resistor 27, and the input of sample gate 26 is connected from ground across resistor 28. Also, a trim resistor $R_{TRIM}$ 29 is connected from the input of sample gate 26 to ground. Antenna 11 is a capacitively and resistively loaded monopole antenna, having a transmit load capacitor 51 and a series transmit load resistor 52 coupled to a ground plane 23. The antenna 11 and associated components and sample gates 25, 26 are mounted within a waveguide cavity 24.

The sample gates are strobed using a pulse forming network 30 driven by a 100 picosecond pulse generator 31 (e.g. transistor). The 100 picosecond pulse generator is controlled by a receive timing clock on line 32. The receive timing clock is swept over a range of delays by an exponential ramp delay circuit 33. The input to the ramp delay circuit is the transmit clock on line 15. The sweep of the ramp delay circuit 33 is controlled by an exponential ramp generator 34 which is coupled across line 35 to the ramp delay circuit 33. The ramp on line 35 also drives a sensitivity time controller 36.

The sample gates 26 and 25 are coupled to differential amplifier 37. The output of the differential amplifier 37 is supplied on line 38 as an input to the sensitivity time controller. This sensitivity time controller compensates for the magnitude of the echoes received as the range of the echo increases.

The output of the sensitivity time controller is supplied to amplifier 39 which supplies a range normalized equivalent time signal on line 40 representing the echoes being received. The sample signal on line 40 is supplied to a signal processor 41 for indicating a characteristic of the target 13 in response to the sample signal.

The exponential ramp generator 34 is controlled by a range sweep generator 45, nominally at 40 Hertz in this example. Also, the 40 Hertz range sweep generator 45 is used to supply a sync signal 46 which is used by the signal processor 41, and otherwise for control purposes in the network.

Thus, the pulse repetition frequency generator 16 drives a transmit pulse generator 18 which supplies a 100 picosecond step to a resistively loaded, cavity backed, monopole antenna 10. The range delay path includes an exponential voltage ramp circuit 34 providing a real time range sweep circuit with, for example, a 0 to 10 nanosecond sweep range. An equivalent time exponential ramp circuit 34 is used for reference, such that the two exponentials track, forming a range sweep that is very linear in time. The exponential voltage ramp circuit is extremely simple, stable, and low cost, providing nanosecond speed sweep circuits. The range is swept at 40 Hertz in the example, and the 40 Hertz sync pulse is provided to trigger a monitor scope or digitizer used by the signal processor 41. The delay circuit drives a fast transistor to provide a gate pulse to the receive sampler. The receive sampler has a transformerless differential input with a high common mode rejection. Differential operation is used to reduce ground currents coupled from the transmit pulse through the sheet inductance of the ground plane. The equivalent time exponential ramp also drives a sensitivity time control 36 that maintains constant amplitude output pulses regardless of range to the target. The STC circuit employs FETs as attenuators that scale according to the range ramp voltage as modified by a range modelling circuit in the STC. A separate signal attenuator and range modelling attenuator FETs are forced to track with high precision through a servo loop.

The absolute accuracy of the system is limited by drift in the gate delays and the components used to implement the radar. One source of such drift is the ramp generator. An alternative system for causing the swept delay could be based on tuned quartz oscillators. A first quartz oscillator used for the pulse repetition frequency generator is set at the desired frequency such as 2 megaHertz. The second tuned quartz oscillator could be set at pulse repetition frequency less the sweep frequency of 40 Hertz (2 megaHertz–40 Hertz). The second sample gate repetition frequency generator would drive the pulse generator in the pulse forming network to strobe the receive sample gates. The 40 Hertz oscillator for synchronizing the signal processor would be triggered by coincidence of the rising edge of the transmit pulse repetition frequency generator, and the receive pulse generator. Because of the stability possible for quartz generators, the drift in the receive and transmit timing signals could be precisely controlled.

The dithering of the pulse repetition frequency generator provides noise immunity with similar systems in the same field. Thus, a number of systems could be positioned as desired at different spatial locations to provide imaging capabilities and synthetic beam forming for narrow beam applications.

Figure 2:
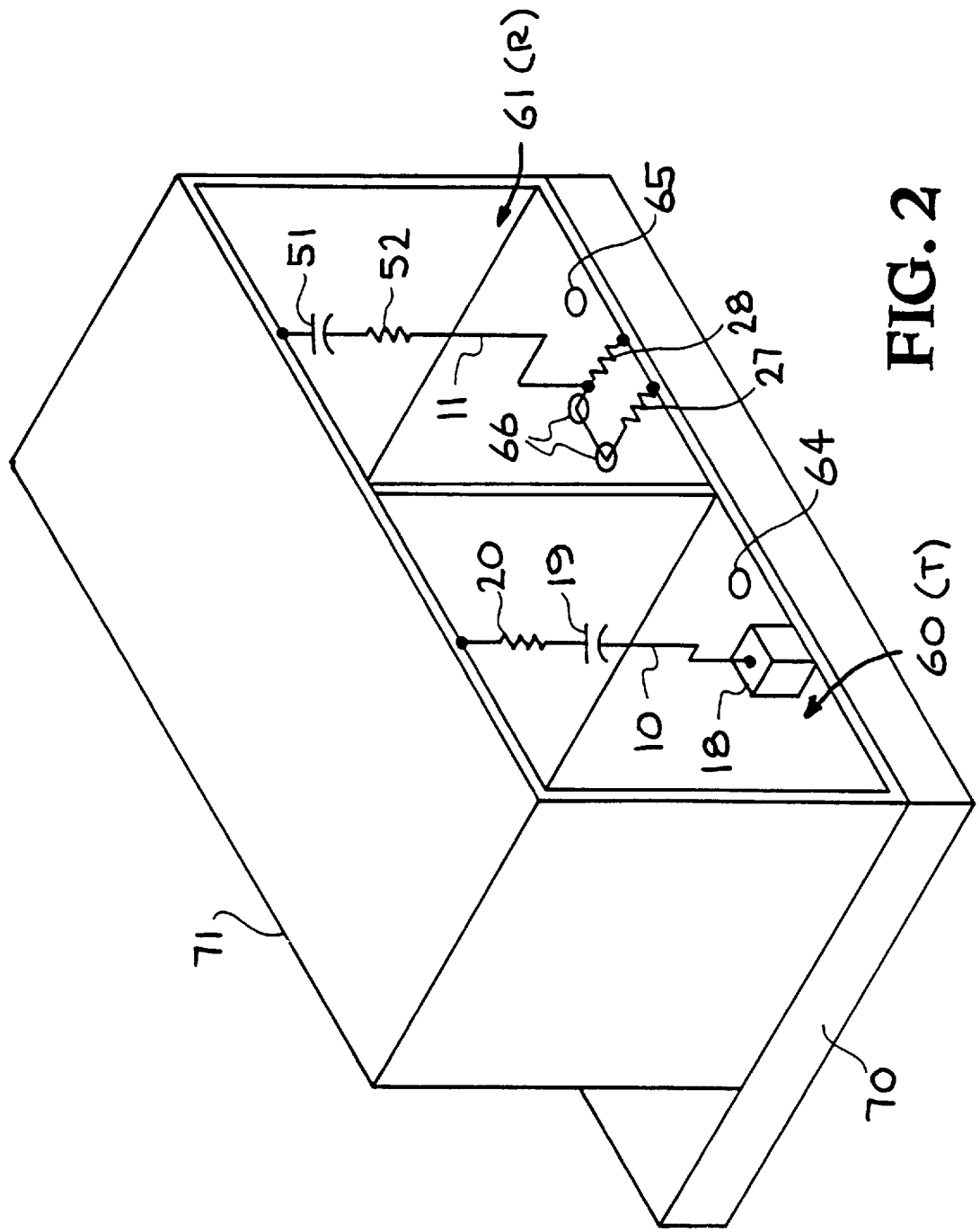
FIG. 2 illustrates the waveguide cavities and antenna configuration of one embodiment of the present invention.

FIG. 2 depicts the physical arrangement of the antennas and the differential sampler. The transmit and receive antennas are enclosed in adjacent cavities, the T cavity 60 and the R cavity 61. Thus, the monopole antenna 10, including the capacitor 19 and load resistor 20 are mounted within a 1½ inch high transmit cavity 60. Also, the transmit pulse generating transistor 18 is mounted within the cavity. A drive feed hole 64 is formed in the transmit cavity 60 through which the electronics communicate.

The receive cavity 61 also includes a strobe feed hole 65 through which the electronics are coupled to the pair of samplers 66 for the receiver. The resistors 27 and 28 are mounted within the receive cavity. Also, the antenna consisting of the load resistor 52 and load capacitor 51 on the monopole 11 are mounted across the 1½ inch high receive cavity 61.

The transmit cavity and the receive cavity are mounted on a shielding box 70, and all circuitry except the items in the transmit and receive cavities are mounted under the shield.

The AC coupling of the resistively loaded monopole antennas 10 and 11 perform different functions. For the transmit antenna 10, the capacitor 19 prevents biasing on the pulse generating transistor 18 from being shunted to ground. The capacitor 51 on the receive antenna prevents residual low frequency currents from the transmit pulse from being coupled into the antenna 11 via the shield.

The transmit and receive cavities are all metal, or metal coated waveguide cavities with an enclosed back 71 which prevents back lobe creation by the transmit antenna, and improves the directional characteristic of the transmitter. With this configuration, the transmitted pulse will propagate with a field of view of about 150° with less than 3 dB attenuation relative to the main lobe. The back lobe generation will be much smaller.

As mentioned above, the cavities are waveguide cavities, and such are preferably designed with the center frequency of the pulses in mind, to operate as a lossless waveguide. In the embodiment described, the approximate dimensions are 1½ inches high, 1½ inches deep, and 1¾ wide, for both the receive cavity 61 and the transmit cavity 60. The base in the example illustrated is 3½ inches deep, ½ inch high, and 3½ inches wide.

Note that the gate pulse generator is underneath the shielding base 70, rather than inside the strobe cavity, while the transmit pulse generating transistor is mounted within the transmit cavity.

The sheet inductance of the radar cavities couples the transmit pulse to the receiver, mostly through the ground plane. The differential input of the amplifier cancels out the ground plane noise. Also, the AC coupling on the receive antenna limits the amount of low frequency noise coupled into the receiver. The shielding provided by the transmit and receive cavities prevents direct coupling of the transmitter pulse into the receiver.

The waveguide launch type system implemented by the waveguide cavity shown in FIG. 2 can be improved using a horn or dielectric lens as described below providing gain for the receive signal and a narrow beam width.

Figure 3:
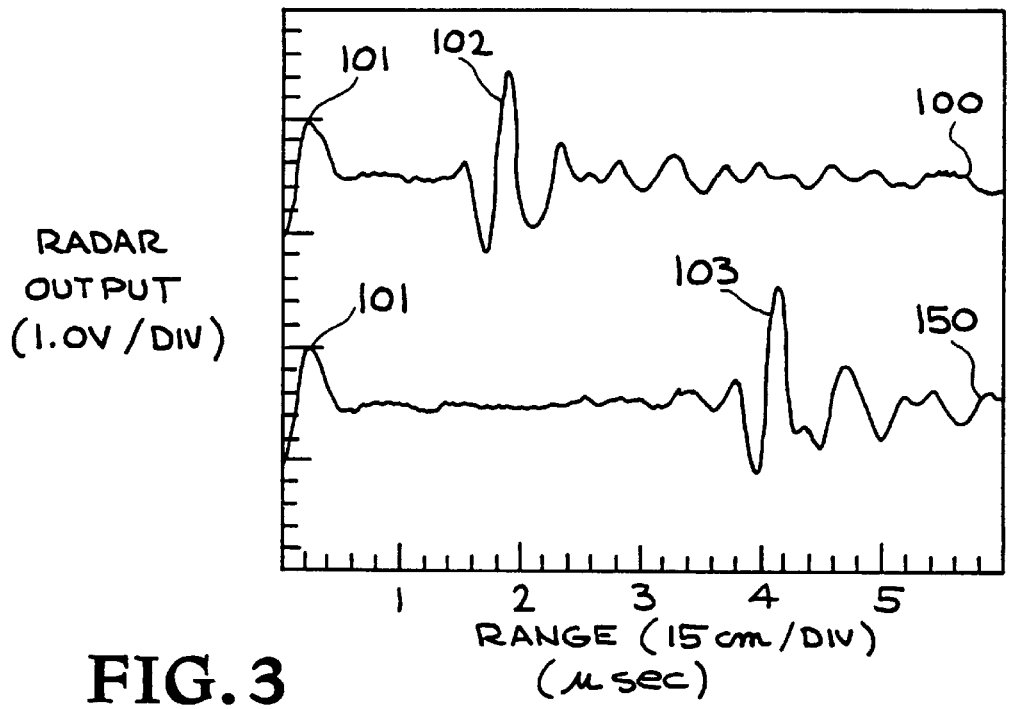
FIG. 3 shows echo returns generated by a radar according to the present invention.

FIG. 3 is a graph illustrating the signals generated using the radar of FIG. 2. The plot is of the sample signal on line 40 from FIG. 1. Two traces are illustrated, a first trace 100 showing the result of an echo at 30 cm and a second trace 150 showing the result of an echo at 60 cm. The signals include an initial pulse 101 which corresponds to the signal bang caused by the transmit pulse. In the trace 100, a pulse 102 is generated from an object at about 30 cm. In trace 150, a pulse 103 is generated from an object at about 60 cm. As can be seen, in the region between the pulse 101 and the pulse 102, or the pulse 101 and the pulse 103, there is very little background noise or clutter. The detected echo has been measured, such that the background noise is about 30 dB lower than the strong return echo.

The clutter in the region between the transmit bang 101 and the signal 103 comes from a variety of sources including ringing in the walls of the wave guide cavities caused by the transmit signal bang. A reduced signal to clutter ratio can be achieved using techniques described below with reference to FIGS. 8 through 11. Further improvements can be achieved by suppressing clutter caused by phenomena other than antenna cavity ringing. In addition, digital background subtraction can be utilized, when processing resources are available to minimize interference form clutter. Also, measurements indicate that jitter of the return echo signals is very low, on the order of 1 picosecond, or about 0.01 inches. Thus, the resolution of the sensor as configured is very fine.

The initial pulses 101 in the traces 100 and 150 at the extreme left are residuals from the transmit "main bang" occurring at less than 4 inches of range. Thereafter, slight ripples seen in the traces going out to the echo represent ringing and clutter that is about 30 dB lower than the echoes 102 and 103 seen at 30 cm and 60 cm. These residuals represent signals more than 1,000 times weaker than the transmit pulse occurring only a few nanoseconds earlier.

Figure 4A:
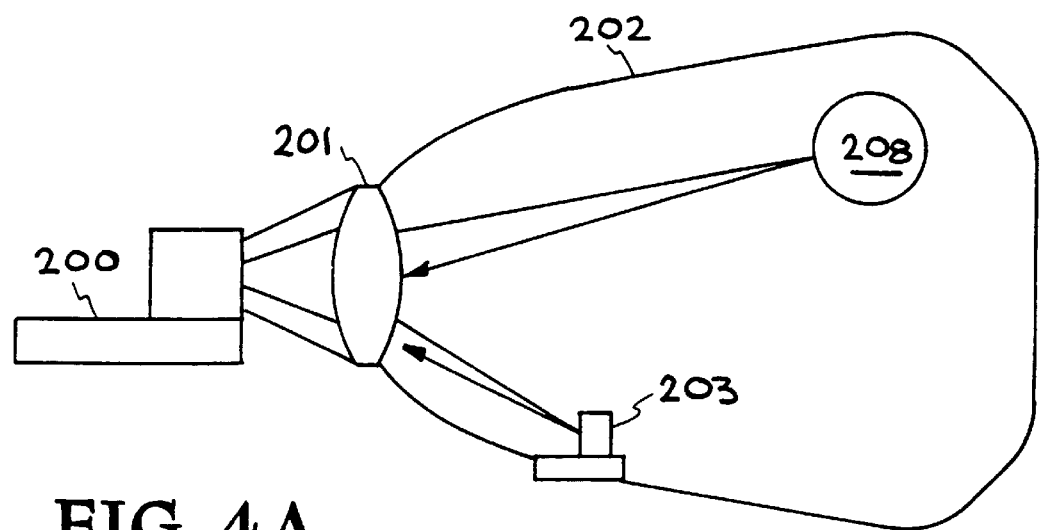
FIG. 4A is a schematic diagram illustrating use of a dielectric lens with the transmitter of the present invention.

FIG. 4A illustrates two features which may be included with the radar according to the present invention. In FIG. 4A, the radar is represented by the symbol 200. The radar emits a signal through a dielectric lens 201 which creates a directional lobe 202, improving the sensitivity and directional control of the radar.

Figure 4B:
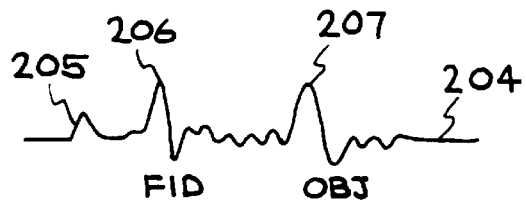
FIG. 4B illustrates a sample signal.

Also, FIG. 4A illustrates use of a fiducial object 203 within the field of the radar 200. The fiducial object may be used with or without the dielectric lens 201 as suits a particular application. The purpose of the fiducial object is to provide precise calibration of the sample signal. Thus, a sample signal 204 is illustrated in FIG. 4B. It includes the initial bump 205, caused by the transmit pulse. An echo 206 is received from the fiducial object 203, and thereafter an echo 207 is received from the object 208 within the field 202 of the radar 200. Because the fiducial object 203 is at a known position relative to the transmitter on the radar 200, any drift in the components of the radar which might be reflected in the distance between the initial pulse 205, and the echo 207 from the object, will be cancelled. This provides a better indication of the distance of the object 208 from the radar 200.

Figure 5:
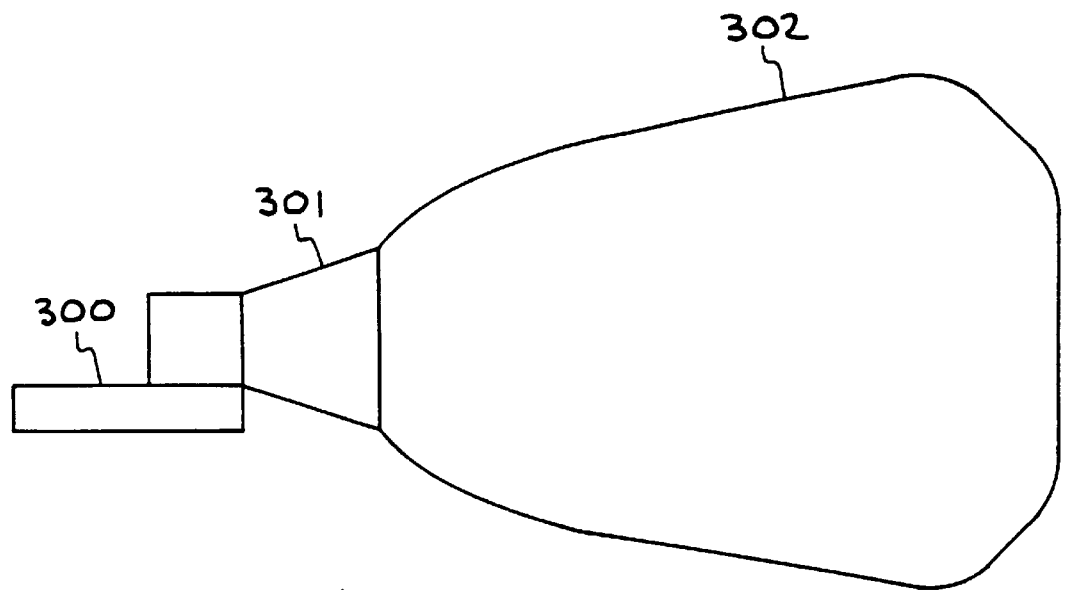
FIG. 5 is a schematic diagram illustrating use of an antenna horn with the transmitter of the present invention.

FIG. 5 illustrates yet another alternative configuration for the radar. In particular, FIG. 5 shows a radar 300 with an antenna horn 301 used for producing a directional lobe 302 for the radar. As will be appreciated by those in the art, the directional horn 301 is another way of improving the sensitivity of the radar, and controlling the directional characteristics of it.

The dielectric lens of FIG. 4A, and the directional horn of FIG. 5 are representative of a wide variety of modifications of the antenna and cavity structure which may be used to control the characteristics of the field within which the sensor operates. When using a dielectric lens to narrow the radiation pattern and obtain antenna gain, it is preferable to use a low dielectric constant material such that Fabry-Perot resonances with the antenna cavities are reduced. For instance, a lens made of petroleum oil in a plastic container provides up to twenty dB gain without introducing ringing, where the dielectric constant $\epsilon_r$ equals 2.5 for the petroleum oil.

Figure 6:
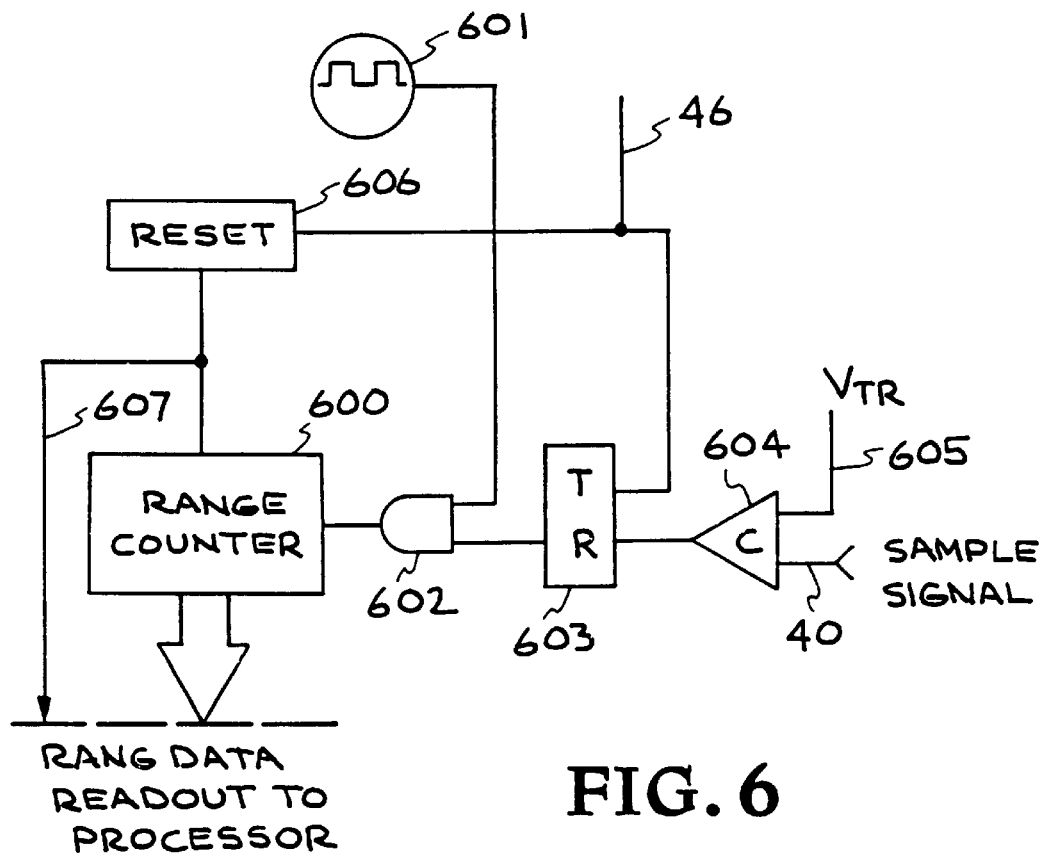
FIG. 6 shows portions of a signal processor for use with the present invention.

FIG. 6 illustrates one signal processing technique which may be used for detecting the distance of an object from the radar. In particular, the signal processor in this embodiment includes a range counter 600 which is driven by a 10 megaHertz clock 601. The 10 megaHertz clock 601 is enabled by gate 602. Gate 602 is turned on by the output of the binary element 603. The binary element is a flip-flop which is set by the 40 Hertz sweep generator sync signal on line 46, on each rising edge. It is reset by output of a comparator 604. The comparator 604 compares the sample signal from line 40 with a threshold voltage on line 605. Also, a reset controller 606 is signalled by the 40 Hertz signal on line 46 to reset the range counter 600, and supplies a reset signal on line 607 to a data processor which processes the data.

The system operates by enabling the range counter 600 at the beginning of each sweep in response to the 40 Hertz signal on line 46. When the sample signal on line 40 crosses the threshold, as indicated by the output of the comparator 604, the binary element 603 is reset, turning off the clock to the counter 600. The value of the counter 600 is then read out, the value indicating the time between the beginning of a range sweep and the receiving of an echo with a sufficient magnitude.

The accuracy of the range counter 600 is determined by the drift in the timing components, and the speed of the clock 601. With a 10 megaHertz clock, and a 40 Hertz range sweep, the granularity of the range counter 600 is 250,000 levels per sweep. This provides highly accurate range data, which can be utilized by a signal processing system to indicate a variety of characteristics of the object.

Also, the 40 Hertz signal on line 46 may be replaced by a similar threshold detector which is used to detect the initial pulse generated in the sample signal, such as the pulse 101, or a fiducial pulse, such as the pulse 206 using circuit techniques known in the art.

FIGS. 7A–7G provide an electrical schematic diagram for the radar circuitry implemented with the antenna structure shown in FIG. 2.

Figure 7A:
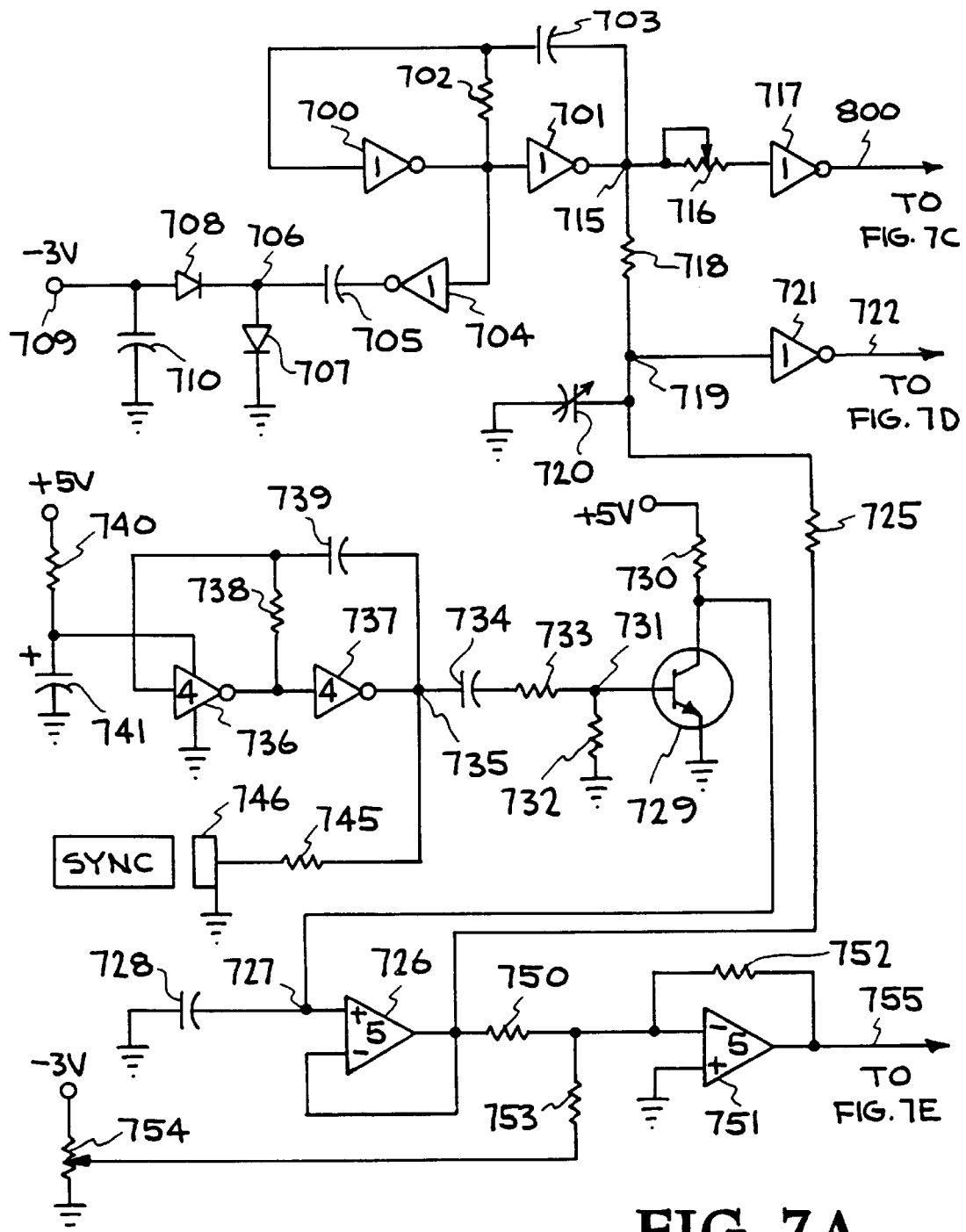
FIGS. 7A–7G provide an electrical schematic diagram of a radar according to the present invention.

FIG. 7A shows the 2 megaHertz pulse repetition frequency generator which is composed of inverter 700 in series with inverter 701. The output of inverter 700 is connected to the input of inverter 701. A resistor 702 is connected from the output of inverter 700 to its input. Also, a capacitor 703 is connected from the output of inverter 701 to the input of inverter 700.

Inverter 704 is connected from the output of inverter 700 to a charge pump including capacitor 705 coupled to node 706. The anode of diode 707 is connected to node 706, and its cathode is connected to ground. The anode of diode 708 is connected to a −3 volt supply node 709, and its cathode is connected to node 706. Capacitor 710 is coupled from ground to the −3 volt supply node 709.

The pulse repetition frequency generator supplies its output on node 715. Node 715 is driven through trim resistor 716 to inverter 717. The output of inverter 717 is supplied to the pulse shaping circuitry described with reference to FIG. 7C which will ultimately drive the pulse generator.

Also, node 715 is connected through resistor 718 to node 719. Node 719 is connected through a trim capacitor 720 to ground. Also, node 719 is the input of inverter 721 which supplies a signal on line 722 which drives the receive timing signal generator circuitry of FIG. 7D.

Node 719 receives an exponential ramp through resistor 725 from the output of op-amp 726. Op-amp 726 has its output connected to its inverting input, and its positive input connected to node 727. Node 727 is coupled through a Mylar capacitor 728 to ground, and to the collector of bipolar transistor 729. The collector of transistor 729 is also coupled through resistor 730 to a 5 volt supply. The emitter of transistor 729 is connected to ground. The base of transistor 729 is connected to node 731. Node 731 is connected through resistor 732 to ground, and through resistor 733 and capacitor 734 to node 735. Node 735 is the output of a 40 Hertz scan oscillator implemented by inverter 736 in series with inverter 737. Resistor 738 is connected from the output of inverter 736 to its input. Also, a Mylar capacitor 739 is connected from the output of inverter 737 to the input of inverter 736. The power supply on inverter 736 is fed by resistor 740 which is connected to a 5 volt supply. Also, a capacitor 741 is connected from the supply input of inverter 736 to ground.

Also, the output on node 735 of the 40 Hertz scan oscillator is supplied through resistor 745 to a sync output 746 which is used by the signal processor.

The signal on the output of op-amp 726 is an exponential ramp which is driven through resistor 725 to the input of inverter 721.

The threshold of inverter 721 establishes an exponential delay characteristic which balances the exponential ramp from op-amp 726 to provide a linear delay sweep for the signal on line 722.

The exponential ramp at the output of op-amp 726 is also connected through resistor 750 to the inverting input of op-amp 751. Op-amp 751 has resistor 752 connected from its output to its inverting input. The positive input of op-amp 751 is connected to ground. Also, the input of inverting op-amp 751 is connected through resistor 753 to a trim resistor 754 for trimming the gain of the STC. The output of op-amp 751 is connected on line 755 to the STC circuit of FIG. 7E.

Figure 7B:
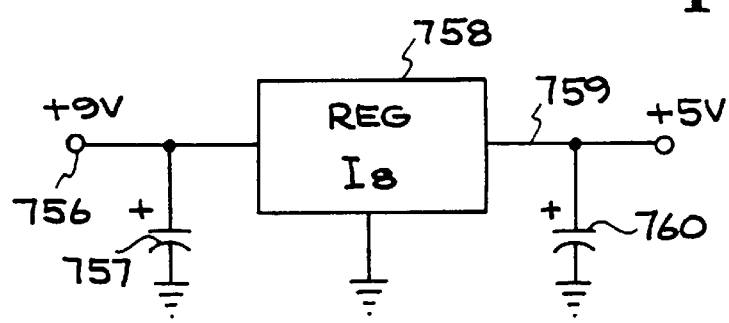

The power supply voltages in this system as shown in FIG. 7B are supplied from a 9 volt battery at input 756. A capacitor 757 is connected from node 756 to ground. A regulator 758 supplies a 5 volt output on line 759. Also, a capacitor 760 is connected from the output on line 759 of the regulator 758 to ground.

Figure 7C:
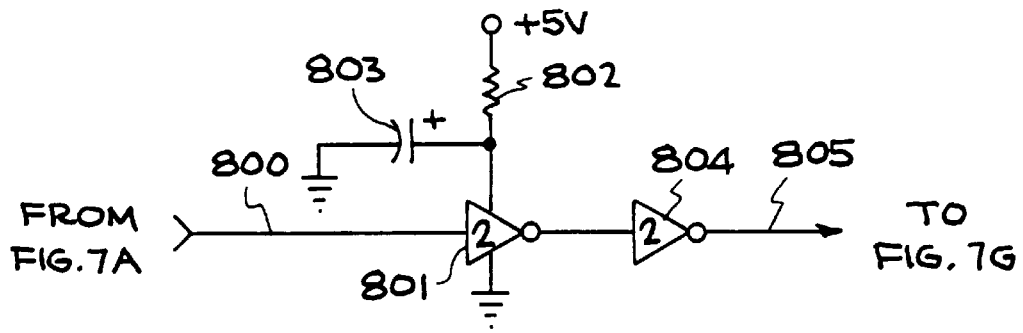
Figure 7D:
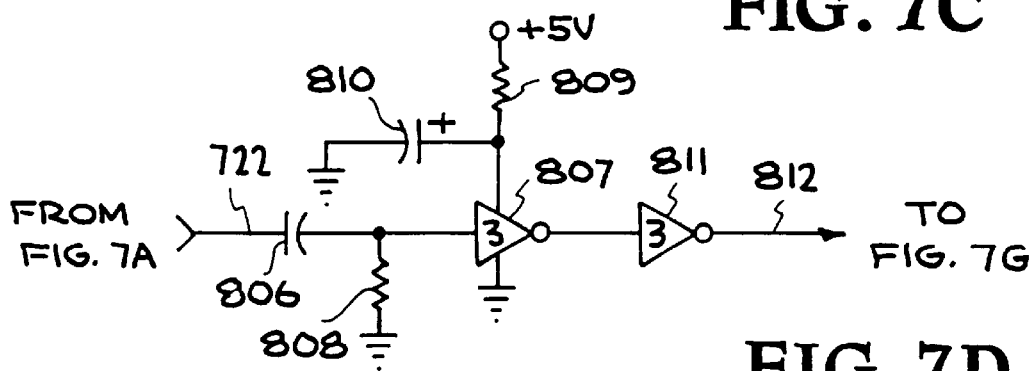

The signal from the output of inverter 717 of FIG. 7A is received on line 800 of FIG. 7C. It is supplied to the input of inverter 801. Inverter 801 has its supply input fed by resistor 802 from a 5 volt supply. A capacitor 803 is connected from the supply input of inverter 801 to ground. The output of the inverter 801 is connected to the input of inverter 804. The output of inverter 804 is connected on line 805 to the transmit pulse generator shown in FIG. 7F.

Also, from FIG. 7A, the signal on line 722 is connected through capacitor 806 to the input of inverter 807. Also, the input of inverter 807 is connected across resistor 808 to ground. The power supply input of inverter 807 is fed by resistor 809 coupled to the 5 volt supply. Capacitor 810 is connected from the supply input of inverter 807 to ground. The output of inverter 807 is connected to the input of inverter 811. The output of inverter 811 is supplied on line 812 to the receive pulse generating circuit in FIG. 7G.

Figure 7E:
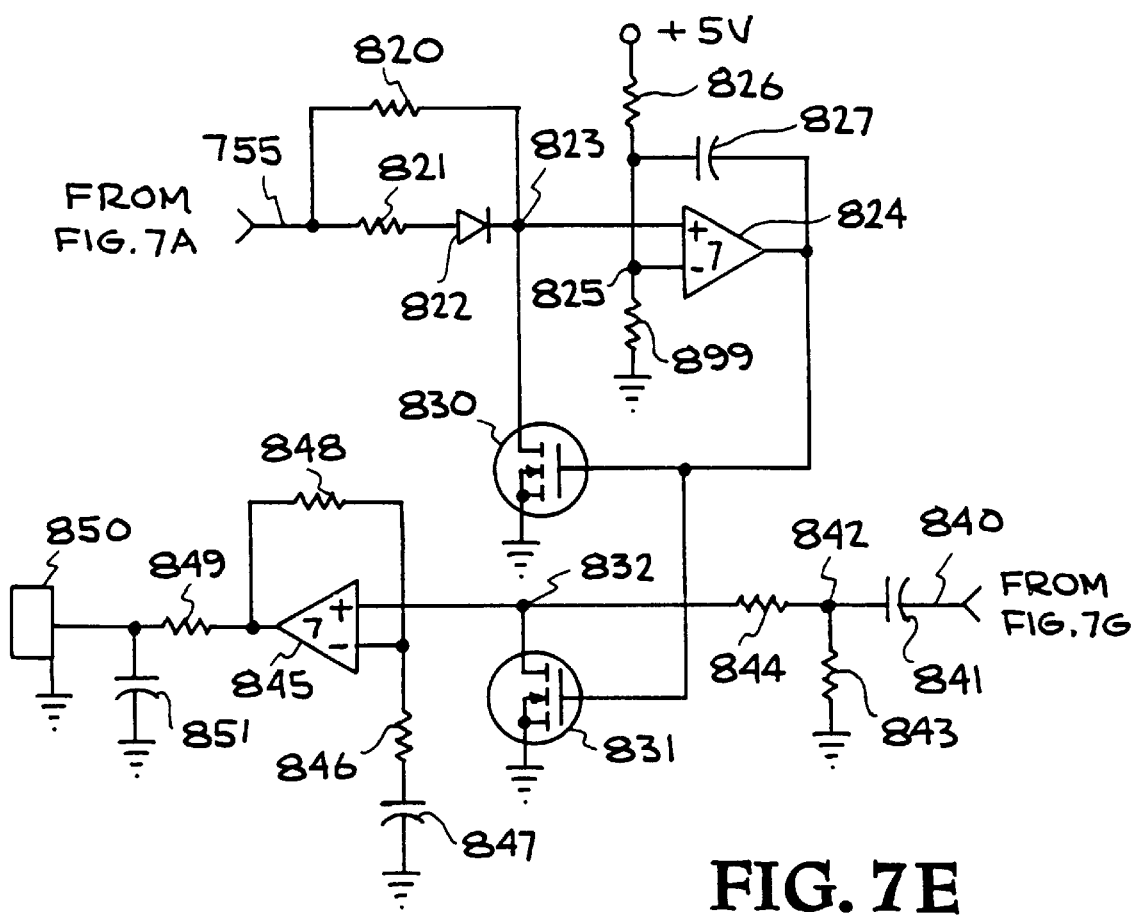

Also in FIG. 7E, the signal on line 755 from op-amp 751 is received through an STC model circuit composed of resistor 820 in parallel with the series connection of resistor 821 and diode 822. This circuitry provides a model of the sensitivity time characteristic to be compensated for by the STC circuit to provide increasing gain with increasing range. The output of the STC model is connected to node 823. Node 823 is connected to the positive input of op-amp 824. The inverting input is connected to node 825. Node 825 is connected through resistor 826 to the 5 volt supply, and through capacitor 827 to the output of the op-amp 824. Also, a resistor 899 is connected from node 825 to ground. The output of op-amp 824 is also connected to the gate of FET transistor 830. The drain of FET transistor 830 is connected to node 823. The source of FET transistor 830 is connected to ground. Similarly, the output of the op-amp 824 is connected to the gate of FET 831. The drain of FET 831 is connected to node 832. The source of FET 831 is connected to ground. The FET 831 provides controlled attenuation of the signal at the node 832 for the STC compensation.

Figure 7F:
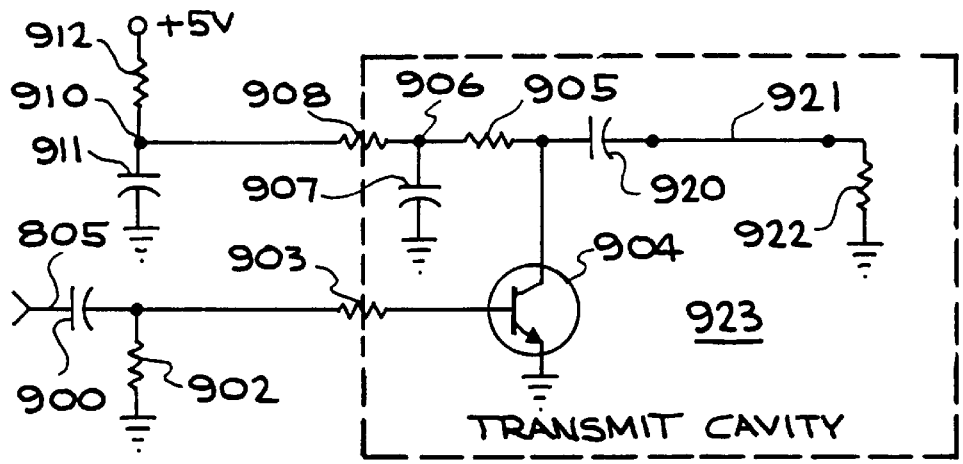
Figure 7G:
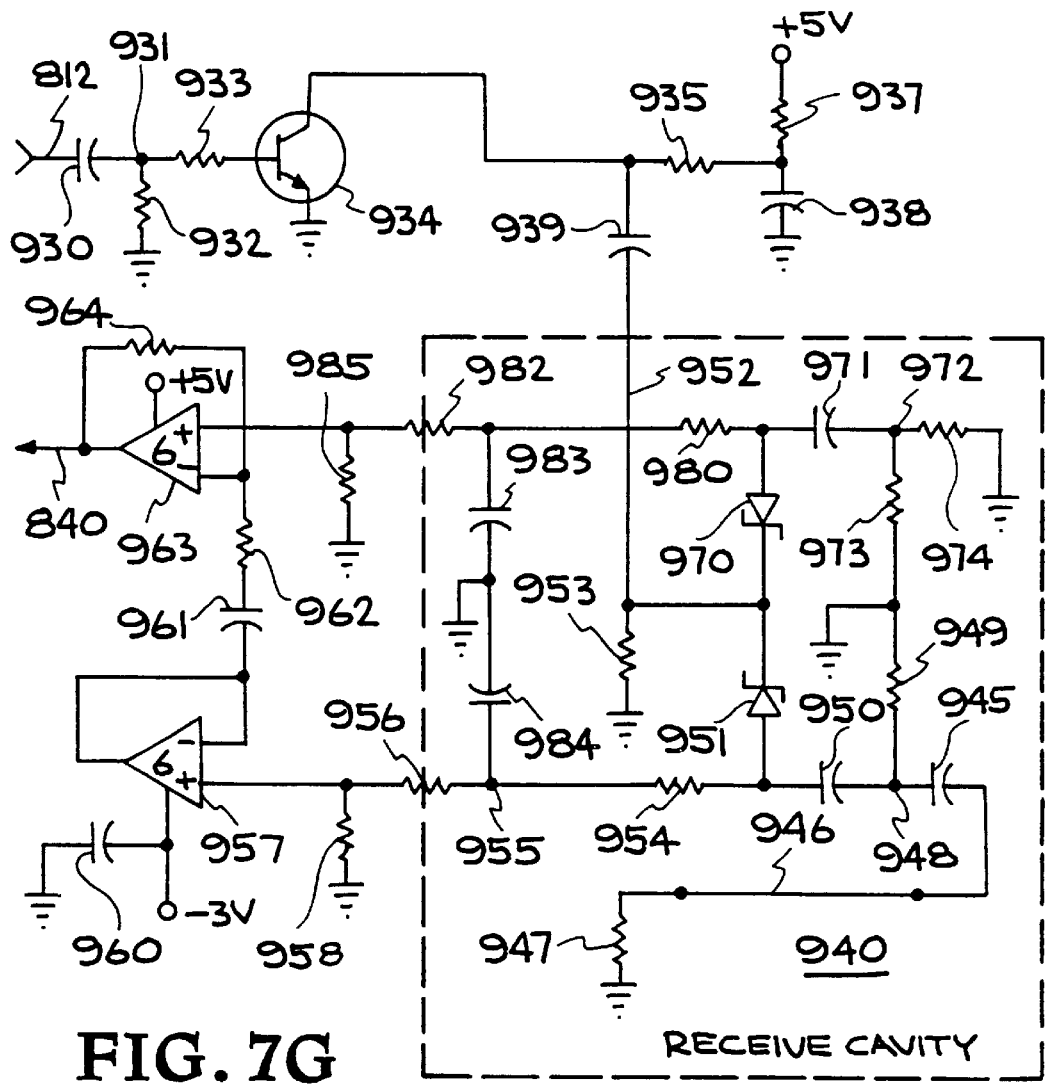

The output of the differential amplifier in the receiver is received on line 840 from the circuitry of FIG. 7G. It is supplied through capacitor 841 to node 842. Node 842 is connected through resistor 843 to ground, and through resistor 844 to node 832. Node 832 is connected to the positive input of op-amp 845. The inverting input of op-amp 845 is connected through resistor 846 in series with capacitor 847 to ground. Also, a resistor 848 is connected from the output of op-amp 845 to its inverting input. The output of the op-amp 845 is supplied through a resistor 849 to a video output 850. Capacitor 851 is also coupled between the video output 850 and ground. The video output 850 provides the equivalent time sample signal as described above.

FIGS. 7F and 7G illustrate the balance of the circuitry in the radar. The transmit timing clock on line 805 is coupled through a capacitor 900 to node 901. Node 901 is connected through resistor 902 to ground and through resistor 903 to the base of transistor 904. The emitter of transistor 904 is connected to ground. The collector of transistor 904 is connected through resistor 905 to node 906. Node 906 is connected through a capacitor 907 to ground and through a resistor 908 to node 910. Node 910 is connected through capacitor 911 to ground, and through resistor 912 to the 5 volt supply. Also, the collector of transistor 904 is AC coupled through capacitor 920 to the monopole antenna 921 which is resistively loaded by resistor 922. The resistively loaded monopole antenna is about 1¼ inches long in this embodiment. Also, the dashed lines 923 illustrate the components which are mounted within the transmit cavity.

The receive timing signal is received on line 812, and coupled through capacitor 930 to node 931. Node 931 is connected across resistor 932 to ground and through resistor 933 to the base of high speed bipolar transistor 934. The emitter of transistor 934 is connected to ground. The collector of transistor 934 is connected through resistor 935 to node 936. Node 936 is connected across resistor 937 to the 5 volt supply, and across capacitor 938 to ground. The collector of transistor 934 also supplies the gate pulse through capacitor 939 to strobe the sampling gates in the receive cavity. The receive cavity is outlined generally by dotted line 940.

A number of components are mounted within the receive cavity 940, including the resistively loaded monopole antenna, capacitor 945, antenna 946, and resistor 947. The antenna is connected from node 948 through resistor 949 to ground, and through a capacitor 950 to the anode of sampling diode 951. A cathode of diode 951 is connected to receive the receive strobe pulse from line 952 through the capacitor 939. Also, line 952 is connected through a resistor 953 to ground. The anode of diode 951 is connected through resistor 954 to node 955. Node 955 is connected across resistor 956 to the positive input of op-amp 957. Also, the positive input of op-amp 957 is connected across resistor 958 to ground. The negative power supply on op-amp 957 is coupled to the −3 volt supply (from FIG. 7A), and across capacitor 960 to ground. The output of op-amp 957 is connected to the inverting input, and through capacitor 961 and resistor 962 to the inverting input of op-amp 963. The inverting input of op-amp 963 is coupled through resistor 964 to its output. The positive power supply on the op-amp 963 is coupled to the 5 volt supply.

The positive input of op-amp 763 is driven through a second sample gate which is connected as follows. In particular, a sampling diode 970 has its cathode connected to line 952 to receive the gate pulse. The anode of diode 970 is connected through capacitor 971 to node 972. Node 972 is connected through resistor 973 to ground. Also, a trim resistor 974 may be included between node 972 and ground.

The anode of diode 970 is connected through resistor 980 and resistor 982 to the positive input of the op-amp 963. The node between resistor 980 and resistor 982 is connected through capacitor 983 to ground. There is a similar capacitor 984 connected between node 955 and ground. Resistor 985 is connected from the positive input of the op-amp 963 to ground.

In FIGS. 7A–7G, inverters 700, 701, 704, 717, 721, 736 and 737 may be implemented with 74HC04. The inverters 801, 804, 807 and 811 may be implemented with 74AC04. The op-amps 726, 751, 824, 845, 963, and 957 may be implemented using the component TLC272. The regulator 758 is implemented with a 812-50 manufactured by Seiko. The transistors 830 and 831 are on a CD4007, with pin 14 at 5 volts and pin 7 at ground. All the diodes are implemented with IN4148's unless noted in the figure. Transistors 904 and 934 are implemented using NE68533. Transistor 729 is implemented using a 2N2222. Component values listed in the figure are representative of one implementation. They may be adjusted to suit the needs of a particular application.

This circuitry provides a differential sampling structure with very high common mode rejection as discussed above. Alternative implementations of the differential receiver circuitry are described in U.S. Pat. No. 5,345,471 issued Sep. 6, 1994 entitled ULTRA-WIDE BAND RECEIVER, filed Apr. 12, 1993. Application Ser. No. 08/044,745. This patent is incorporated by reference for the purpose of teaching alternative receiver technologies.

Figure 8:
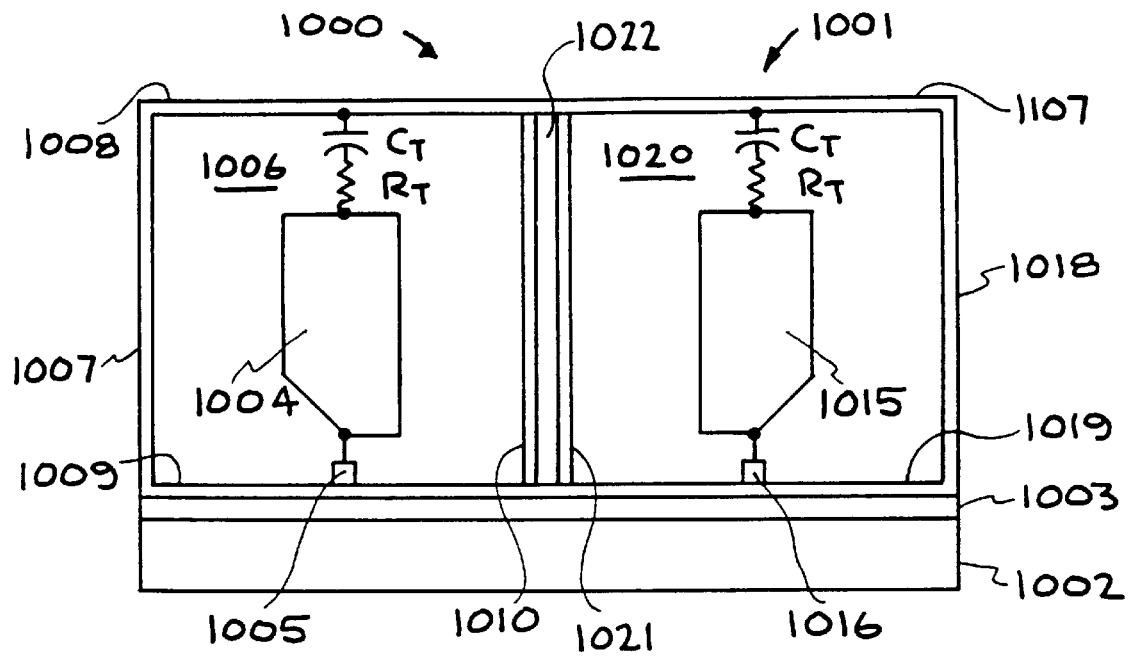
FIG. 8 is a drawing of the receive and transmit cavities decoupled from one another by a space between the cavities.

FIGS. 8, 9, 10, and 11A through 11C illustrate techniques for reducing clutter, by damping ringing in the transmit and receive cavities. FIG. 8 illustrates the use of the double wall structure between the cavities. Thus, a transmit cavity 1000 and a receive cavity 1001 are mounted on an electronics cavity 1002. A printed circuit board 1003 buffers the electronics cavity 1002 from the transmit cavity and receive cavity 1001. Within the transmit cavity, a leaf antenna 1004 is coupled to a transmit pulse drive transistor 1005, and to a series connection of resistor Rt (about 220 ohms) and capacitor Ct (about 2 picoFarads). This configuration makes a resistively loaded monopole antenna for transmitting the transmit pulse into the field. The transmit cavity 1000 is configured in a wave guide configuration having height of about 1.5 inches and a width of about 1.5 inches. The transmit cavity has back wall 1006, a side wall 1007, a top wall 1008, and a bottom wall 1009. An interior wall 1010 encloses the cavity. The walls of the transmit cavity are made using brass in this embodiment.

The receive cavity similarly includes a leaf antenna 1015 mounted in a resistively coupled monopole configuration using a resistor Rt (about 220 ohms) and capacitor Ct (about 2 picoFarads) in series to connect it to the receive cavity 1001. The sampling electronics 1016 are located at a feed point and inside the electronics cavity 1002. The receive cavity, also made of brass in this example, has a top wall 1017, a side wall 1018, a bottom wall 1019, and a back wall 1020. An interior wall 1021 encloses the cavity. The dimensions of the receive cavity are substantially the same as those of the transmit cavity. As shown in FIG. 8, the combination of the receive cavity 1001 and transmit cavity 1000 form a double wall structure by spacing apart the interior walls 1010 and 1021 of the respective cavities. The region 1022 between the walls 1010 and 1021 may be filled with air, or another dielectric material, such as a printed circuit board or the like. This prevents the signal bang caused by the transmit pulse from being directly coupled into the receive cavity walls from the transmit cavity, substantially reducing ringing and signal clutter. The top and bottom walls of the transmit and receive cavities may be metallically contiguous.

Figure 9:
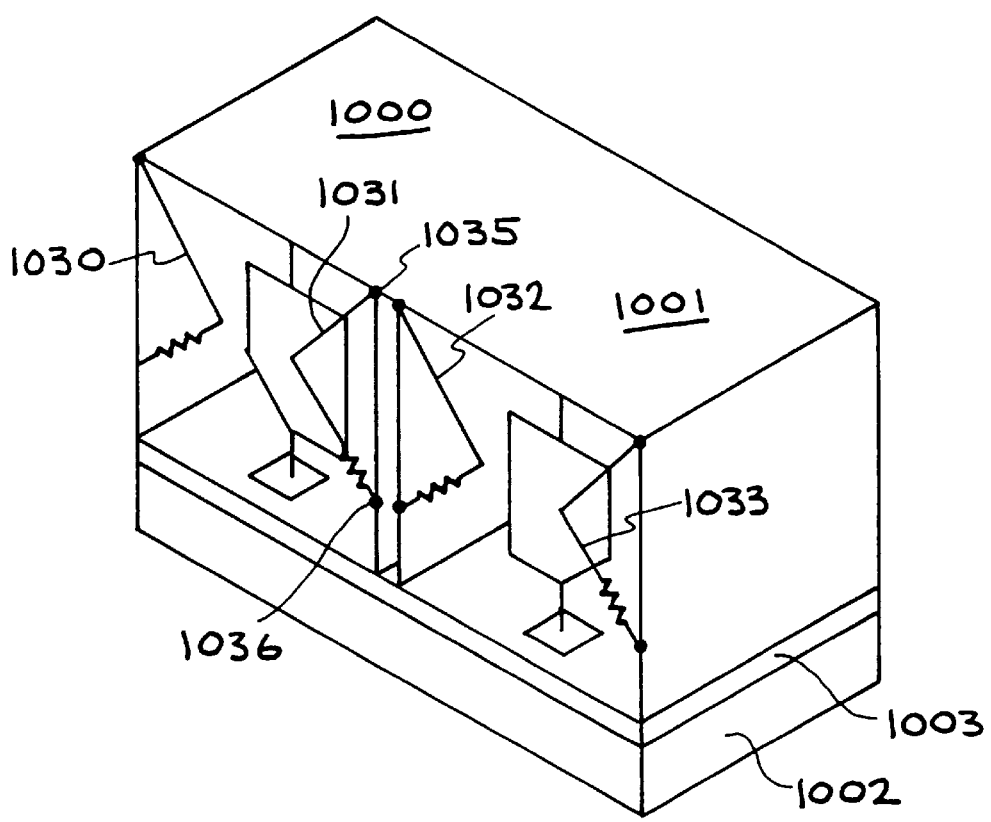
FIG. 9 is a drawing of the receive and transmit cavities using conductive damping elements coupled to the perimeters of the openings on the receive and transmit cavities.

FIG. 9 illustrates another technique for reducing ringing based on a conductive damping element in the transmit and receive cavities. The transmit and receive cavities are configured in FIG. 9 just as they are in FIG. 8. The elements of these cavities are not redescribed herein. The additional feature shown in FIG. 9 is made up of the conductive damping elements 1030, 1031, 1032, and 1033. These damping elements each consist of a conductive element which is connected at two places to the perimeter of the opening of the cavities. Thus, the conductive damping element 1031 is connected to the corner 1035 of the transmit cavity, and to one side of the perimeter of the opening in the transmit cavity, substantially near the center, such as at point 1036. The conductive damping elements include a resistor Rd which is about 100 ohms in this example. These resistive damping elements are preferably placed along the side walls of the cavity, and flush with the opening or extending out into the field slightly. These narrow band dampers eliminate long lasting, high Q ringing which results from the transmit bang signal. The triangular shape is not critical, but appears to be preferred based upon trial and error (the conductors could be, for instance, formed in a rectangular shape). The orientation plane in which these triangle sections lie is also not critical. The total length of the conductor is shown to approximate scale in the figure. There appears to be a narrow band impedance transformation along the length of the conductor that aids in ringing suppression, so that conductor length needs to be approximately as shown. The length of the conductors and the resistance can be empirically determined based on a particular implementation and design of the transmit and receive cavities used.

Figure 10:
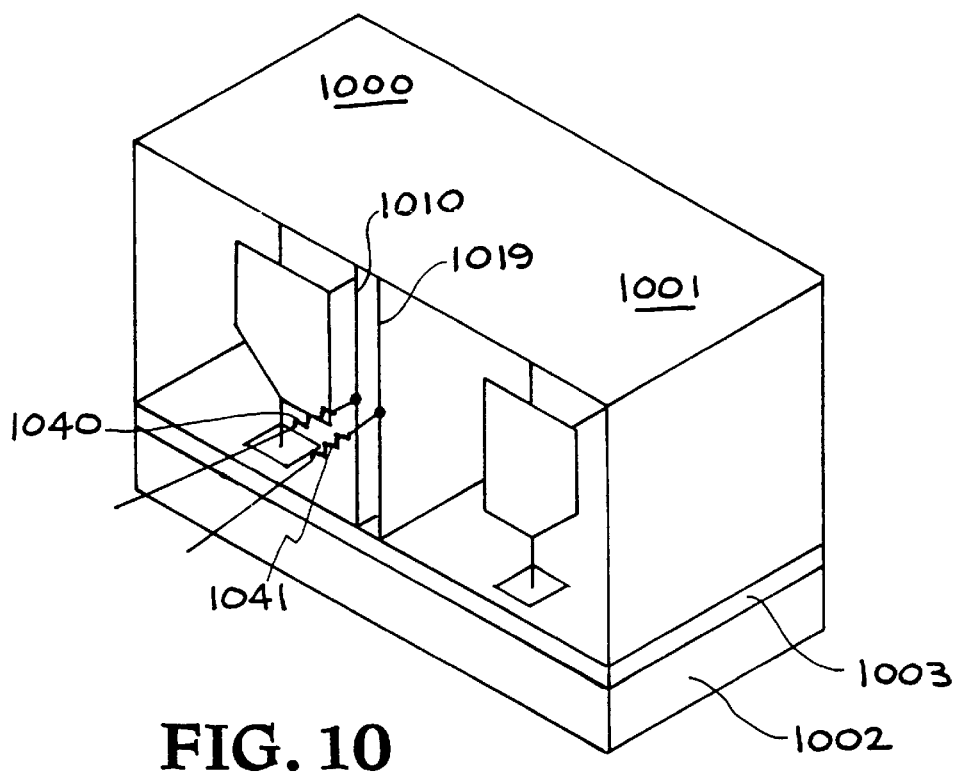
FIG. 10 is a drawing of the receive and transmit cavities having radiative damping elements extending from the perimeter toward the field being sensed.

FIG. 10 illustrates another technique for reducing clutter in the received signal. The transmit and receive cavities are configured substantially as shown in FIG. 8 and are not redescribed here. The feature illustrated in FIG. 10 is narrow band radiative damping elements 1040 and 1041. These elements comprise damping resistances of Rn of about 100 ohms, and radiative conductors which extend approximately an inch out from the center of the opening of the transmit cavity and receive cavity on the interior walls 1010 and 1019. Again, the length and resistances can be empirically determined based on the particular design of the transmit and receive cavities.

Figure 11A:
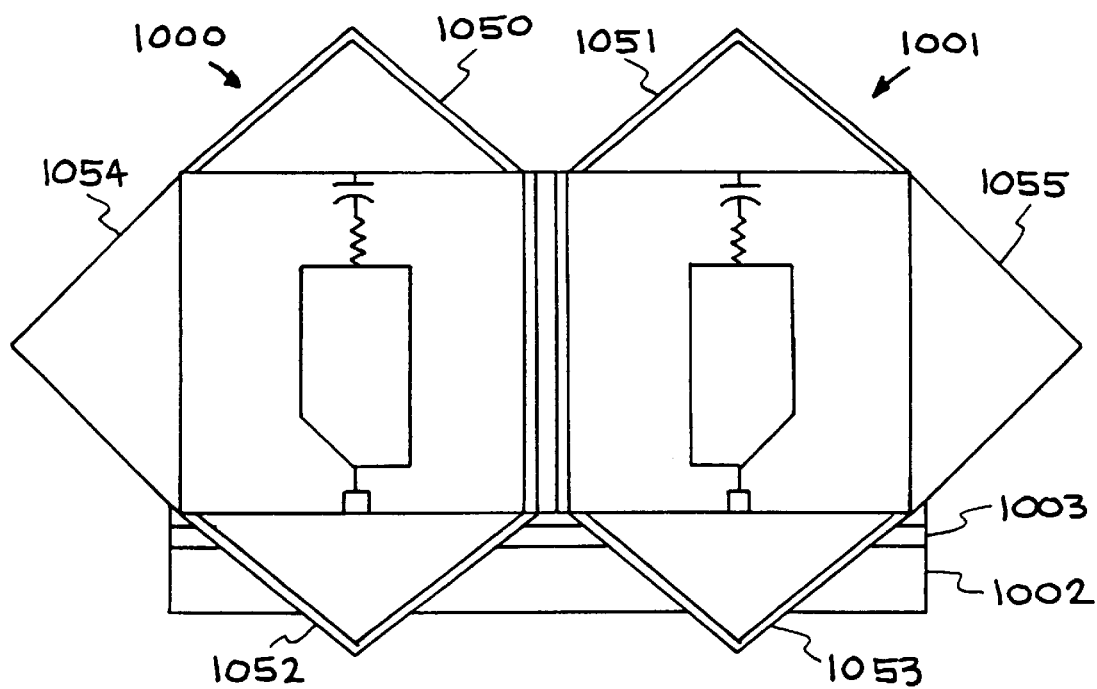
FIG. 11A is a drawing of the receive and transmit cavities having triangular terminating plates coupled to the perimeters of the receive and transmit cavities.

FIG. 11A illustrates yet another alternative for reducing clutter. According to the alternative shown in FIG. 11A, triangular terminating plates are coupled to the perimeter of the opening of the transmit and receive cavities 1000 and 1001. Again, the transmit and receive cavities are configured as shown in FIG. 8 and are not redescribed here. The triangular plates include plate 1050 which is coupled to the perimeter of the opening of the transmit cavity 1000 along the top wall of the cavity. Triangular plate 1051 is coupled to the perimeter of the opening of the receive cavity 1001 along the top wall. Triangular element 1052 is coupled to the perimeter of the opening of the transmit cavity 1000 along the bottom wall, triangular element 1053 is coupled to the perimeter of the opening of the receive cavity 1001 along the bottom wall. Triangular element 1054 is coupled to the perimeter of the opening of the transmit cavity 1000 along the outside wall. Triangular element 1055 is coupled to the perimeter of the receive cavity 1001 along the outside wall. The plane in which the triangular elements 1054 and 1055 lie substantially parallel to the plane of the openings 1057 and 1058. The terminating elements 1050, 1051, 1052, and 1053 are folded slightly toward the field being sensed, such as at a 45° angle. This supplies some antenna gain, damps residual ringing, and provides some side load suppression. Again, the dimensions of these plates are substantially as illustrated in the figure, using triangular elements which are equilateral triangles having a peak of about one inch away from the plane of the openings in the transmit and receive cavities.

Figure 11B:
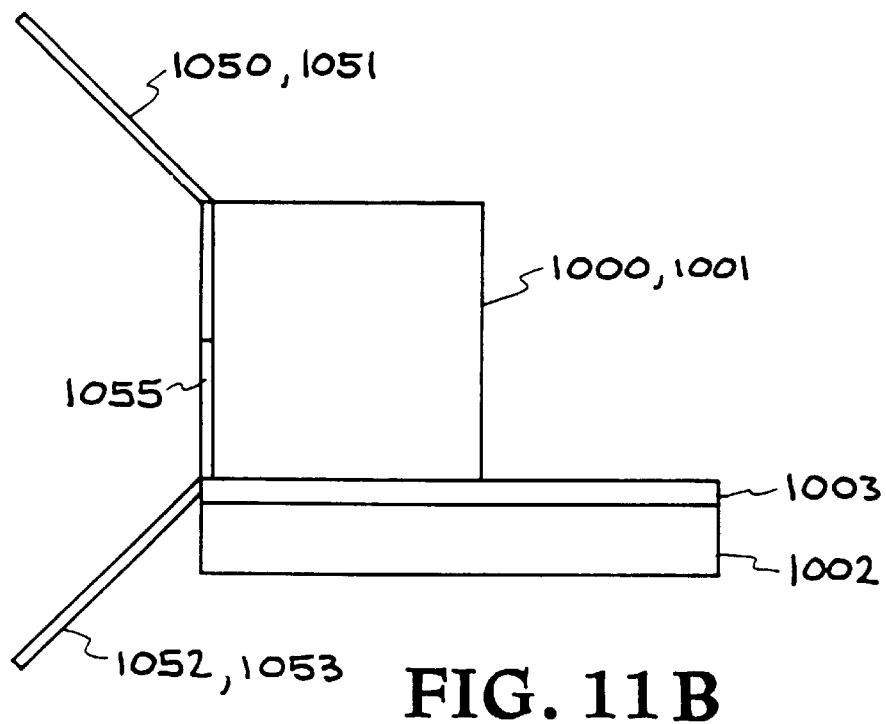
FIGS. 11B and 11C provide side and top views of the structure of FIG. 11A, to show positioning of the terminating plates.
Figure 11C:
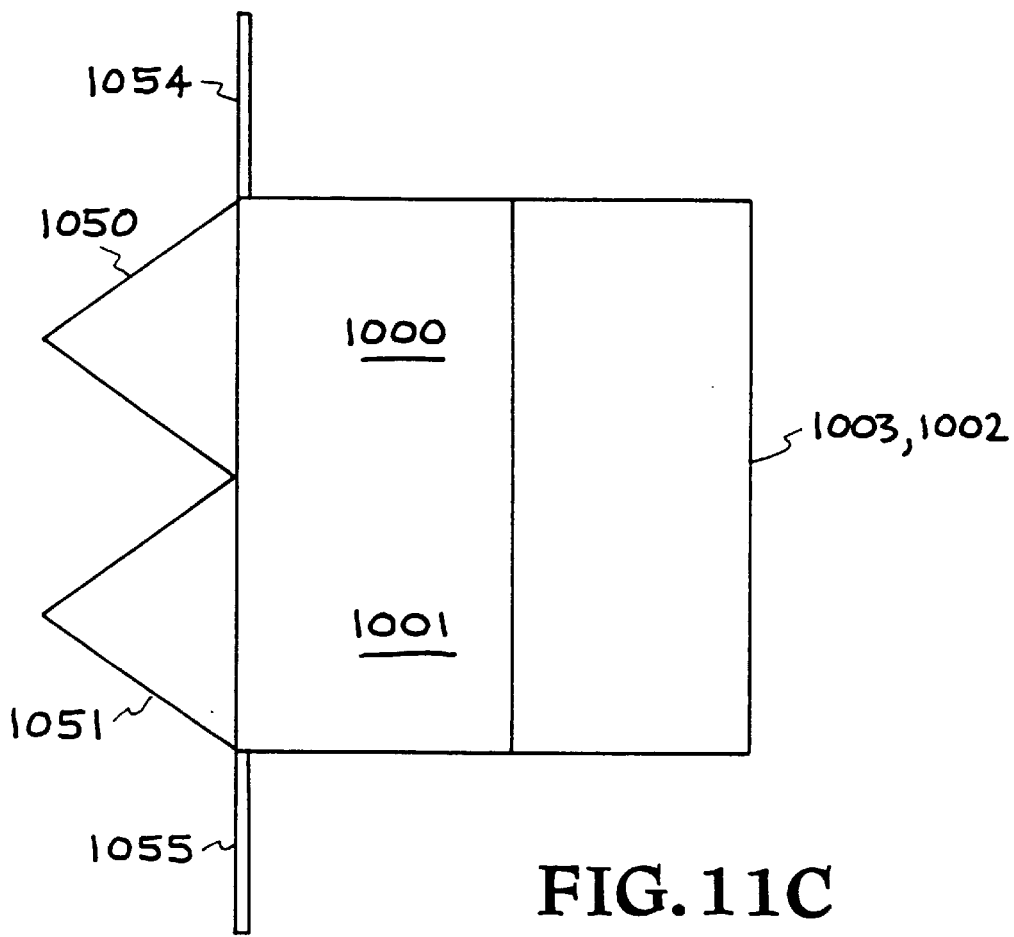

FIG. 11B illustrates how the triangular elements 1050, 1051, 1052, and 1053 are folded into the field being sensed at an angles of about 45°. The triangular element 1055, however, lies substantially in the plane of the opening. FIG. 11C illustrates the configuration of the triangular elements 1055 and 1054. Thus, the transmit cavity 1000 and receive cavity 1001 are shown in top view. The triangular elements 1050 and 1051 can be seen leaning into the field being sensed. The triangular elements 1055 and 1054 extend substantially at right angles away from the side walls of the transmit and receive cavities. However, it may be desirable to flatten the triangular elements 1050, 1051, 1052, and 1053 so that the mechanism can be smoothly dragged along a surface without hanging on the triangular terminating plates.

Figure 12:
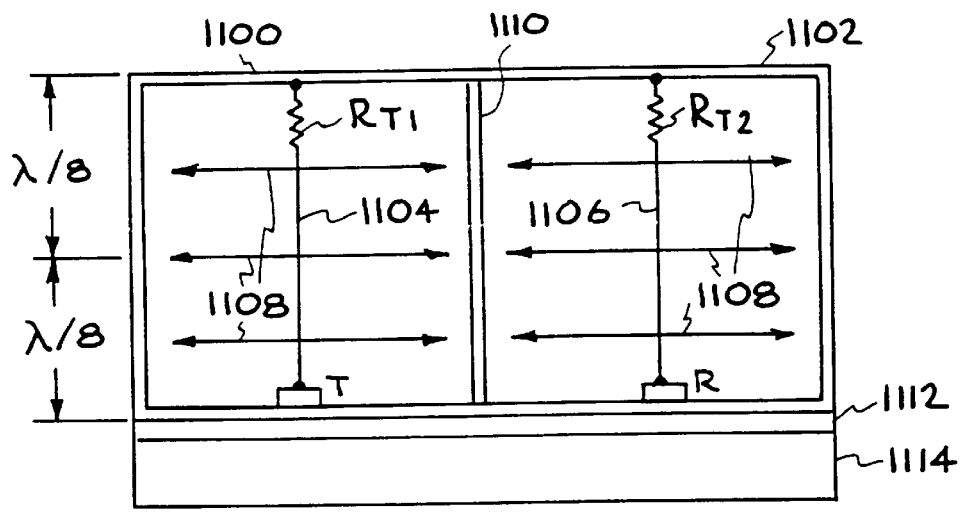
FIG. 12 generally illustrates the E-field produced by the side-by-side cavity/antenna configurations of FIGS. 2, 8–11A.

The microradar rangefinder embodiments of FIGS. 2, 8–11A all have a side-by-side radiator configuration as generally shown in FIG. 12. Each such ultra-wideband radar rangefinder has a transmit cavity 1100 and a receive cavity 1102 arranged side-by-side with vertical internal radiator elements 1104, 1106 that are spaced apart and parallel. (The radiator elements include both a transmit radiator element 1104 and a receive radiator element 1106). These radiator elements 1104, 1106 can be wires or metal strips of about ¼" width for a 2 GHz center frequency system, and they are terminated at their far ends with resistors, typically $R_{T1} = R_{T2} = 200\Omega$.

A primary problem with this side-by-side arrangement is that the E-fields 1108 from each cavity terminate on adjacent sides of a metal septum or dividing wall 1110. The septum 1110 is $\lambda/4$ long, or $\lambda/8$ long from either end to the center. Thus, the septum 1110 is isolated from the grounded end regions by $\lambda/8$, thereby exhibiting a non-zero impedance to the E-fields 1108. As a consequence, coupling occurs between the cavities 1100, 1102 that results in a substantial "main bang" pulse which obscures reflections from nearby objects. e.g., from 0 to 6". In the embodiments of FIGS. 8–11A, the septum 1110 comprises two closely spaced metal plates, rather than one plate as shown, to help reduce this coupling.

A secondary limitation to this side-by-side configuration is the difficulty in assembly of the metal cavities 1100, 1102 about the PCB 1112, which separates the cavities 1100, 1102 from shielded electronics cavity 1114.

Figure 13:
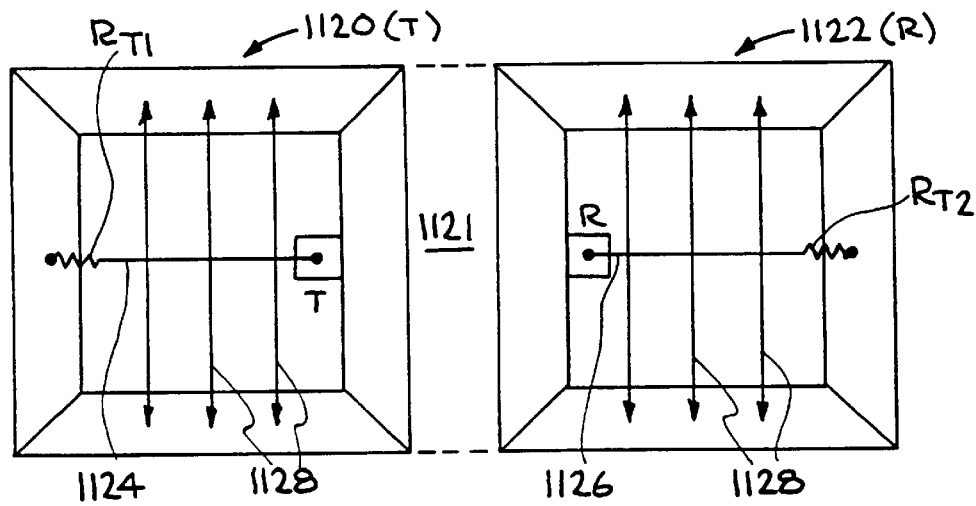
FIG. 13 generally illustrates an alternate opposed cavity/antenna configuration and the E-field produced therein.

FIG. 13 shows an alternate antenna configuration where the E-fields do not terminate on adjacent sides of a septum. Rather, they are far apart. Additionally, the far ends of the radiators, with termination resistors $R_{T1}$, $R_{T2}$ are at maximum distance for best T-R isolation. The UWB radar rangefinder comprises a transmit cavity 1120 and a receive cavity 1122, which are separated by an air gap 1121. The radiator elements 1124, 1126 extend in opposed directions from near air gap 1121. The radiator elements are wires or metal strips which are generally coplanar but extend in opposed directions. The E-fields 1128, which extend from radiators 1124, 1126 thus do not terminate at a common plane between cavities 1120, 1122. Experiments show this configuration to be nearly 10x better than the side-by-side configuration regarding main bang coupling. Further, the horns (i.e., cavities 1120, 1122) need not be in metallic contact, i.e.. they can be separated by air gap 1121, and can be snapped onto the PCB using finger stock to retain them.

Figure 14:
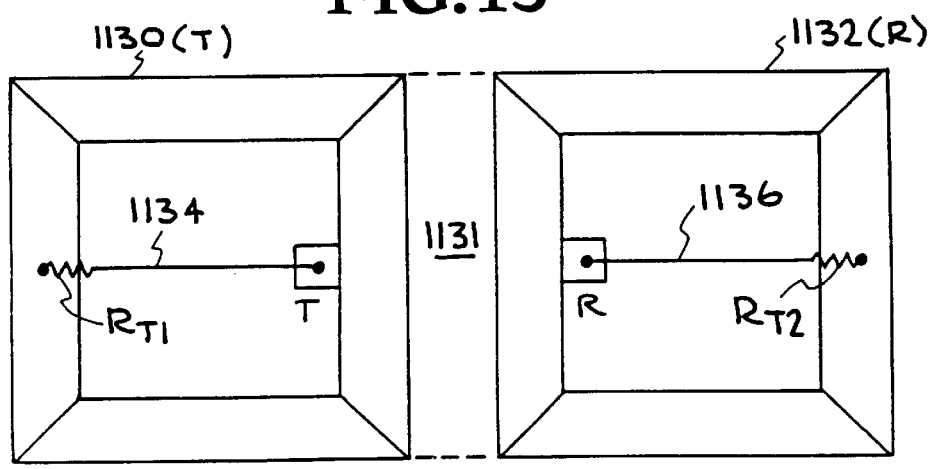
FIGS. 14A, B are front and side views of the transmit and receive cavities with opposed radiator elements of simple geometry.
FIGS. 14C is a side view of opposed radiator elements of morecomplex geometry.
Figure 14:
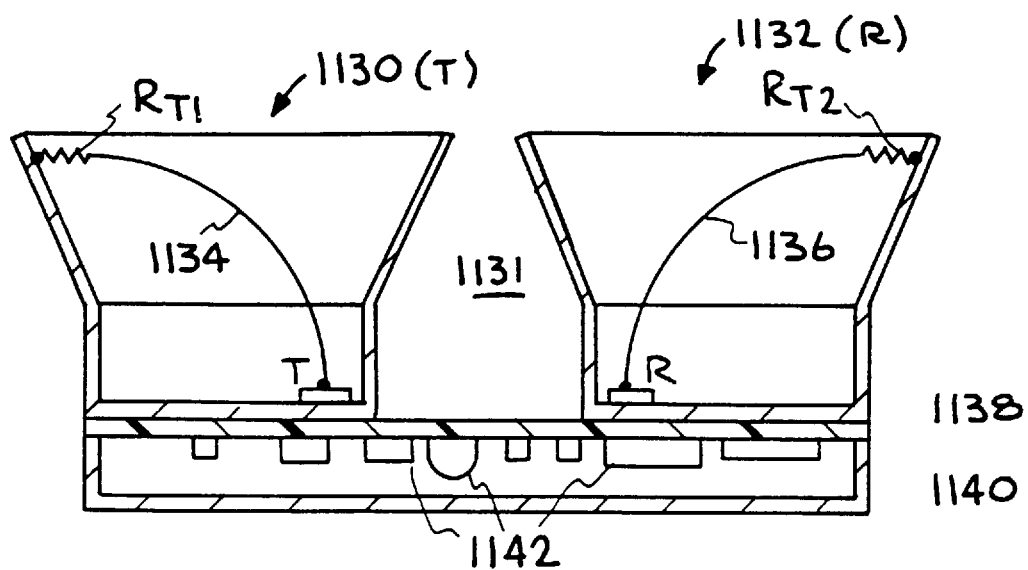
Figure 14:
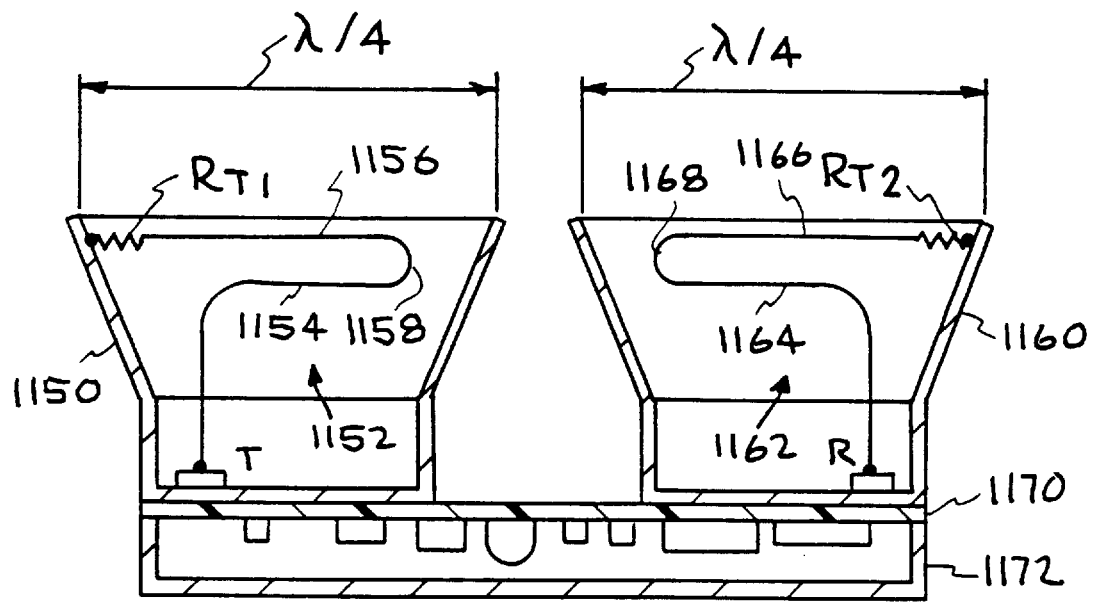

FIGS. 14A and 14B provide a front and side view of the transmit and receive cavities 1130, 1132 to better illustrate the placement of the horns 1130, 1132 and their internal radiators 1134, 1136. As in side-by-side embodiments, the radiator may be a wire, or it may be a metal strip of some experimentally determined width that optimized radiation efficiency and bandwidth. Horns 1130, 1132 are separated by an air gap 1131 and are mounted on a PCB 1138 which separates horns 1130, 1132 from electronics cavity (shield) 1140 which contains the various rangefinder electronic components 1142, mounted on the reverse side of PCB 1138.

Transmit radiator (e.g., wire) 1134 extends from transmitter output T on PCB 1138 to a distal wall of horn 1130 through termination resistor $R_{T1}$. Similarly, receive radiator (e.g., wire) 1136 extends from receiver input R to a distal wall of horn 1132 through termination resistor $R_{T2}$. Transmitter output T and receive input R are located inside horns 1130, 1132 near the air gap 1131 separating the horns 1130, 1132. Thus, radiators 1134, 1136 extend away from the interface between the two cavitites 1130, 1132. Cavity 1130 transmits a pulse towards an object, and cavity 1132 receives an echo reflected back from the object.

FIG. 14C depicts a more complex radiator configuration, a top-loaded radiator wherein the drive/pickoff is connected to the top, or high impedance end, of a monopole that is approximately $\lambda/4$ long at the radar's center frequency. Transmit cavity/horn 1150 contains a transmit radiator 1152 which is formed of two sections 1154, 1156 which are connected through a bend or hairpin turn 1158. Similarly receive cavity/horn 1160 contains a receive radiator 1162 which is formed of two sections 1164, 1166 which are connected through a bend or hairpin turn 1168. The horns 1150, 1160 are mounted on a PCB 1170 which has a shield or cavity 1172 mounted on the reverse side. Radiators 1152, 1162 thus extend from output T, input R across the cavity and back, terminating at the distal walls in $R_{T1}$, $R_{T2}$. With this connection, both the transmit antenna and the receive antenna provide about 6 dB gain over that of FIG. 14B, which is similar to the embodiments of FIG. 12. It is thought that radiation from sections 1154, 1156 are additive when the distance between the centers of section 1154, 1156 are separated by λ/4 along the wire's hairpin turn 1158.

As a final improvement, the receive radiator 1162 is left unterminated on the PCB 1170, at the receiver R input. This results in a doubling of the received voltage and thus an improvement in sensitivity. Far end termination resistors $R_{T1}$, $R_{T2}$ reduce or eliminate ringing. In all, this configuration provides about 18 dB more sensitivity over the configuration of FIG. 12.

Thus the opposed radiator arrangement shown generally in FIG. 13, and illustrated more specifically in FIGS. 14A–C, significantly reduces main bang coupling between the cavities over the side-by-side configuration shown generally in FIG. 12 and illustrated more specifically in FIGS. 2, 8–11A. In addition, the conductive damping elements shown in FIGS. 8–11A for the side-by-side arrangement are not generally required in the opposed radiator arrangement.

With the alternate antenna configuration of the opposed arrangement, main bang coupling from the transmit antenna to the receive antenna are reduced so that the radar can operate at zero range, thus allowing the detection of near-surface objects such as the human heart or rebar in concrete. Uses include heart monitoring, wall thickness measurements, bridge deck imaging and radar altimeters. The lower cost and simplified assembly also provided by the opposed antenna configuration allow high volume applications such as non-contact gas tank fill-level measurements.

Accordingly, a highly accurate, low cost, simple to implement wide band radar sensor is provided with a swept range gate which provides an amplitude versus time sample signal making the radar useful as a radar range finder. The radar range finder of the present invention replaces ultrasound ranging sensors used in industry which suffer the variation in speed of sound over temperature and humidity, reflections off foam in vats giving false level measurements and the like, industrial environments generating ultrasonic interference, and the inability of ultrasound to penetrate panels, or a dirt or water overcoating blocking the transducer. All of these deficiencies are solved by the present invention, with a low cost, versatile, and highly accurate sensor.

Besides the fluid level measurement systems which have been primarily implemented with ultrasound in the prior art, the present invention has other immediate uses in automotive parking assistance and cruise control radar. Yet another use for this sensor is hidden object location, such as finding and precisely ranging between wall studs and pipes, rebar in concrete, weapons in briefcases or mattresses, and buried wires and pipes. The range finding applications also have many uses in the robotics field.

Although the embodiment described is based on a transmitter which issues a sequence of single impulse RF signals by the transmitter, a similar system can be implemented using a sequence of bursts of RF energy of several cycles in length. The impulse transmission embodiment may have limited applications because of Federal Communications Commission Part 15 regulations over the transmission methods allowed for wide band pulses.

Another application of the present invention is an educational one. In particular, time domain electromagnetics can be studied using this simple radar with an equivalent time output signal. A student may, in real time, monitor the characteristics of the field of the radar in a manner to be studied, and watch the results on the echoed pulses in the sample signal.

Thus, the present invention has provided a low cost, high accuracy radar with high resolution swept range gate for close range applications. The uses include automotive parking assistance, curb sensing, active suspension system sensing, occupant position sensing, and other applications where the precise range of an object needs to be determined. The range finder also makes an excellent fluids and solids level sensor for petroleum storage tanks, industrial mixing vats, and grain silos. Its amplitude scan display also indicates the presence or absence of objects behind barriers, such as studs behind walls and rebar in concrete. The device can also be used in medical applications to sense movement of organs such as the heart within the swept range.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A swept range gate radar for detecting characteristics of objects within a field, comprising:
    a transmitter, including a shielded transmit cavity and a transmit antenna within the shielded transmit cavity, which transmits a sequence of electromagnetic pulses from the transmit antenna into the field in response to a transmit timing signal;
    a receiver, including a shielded receive cavity and a receive antenna within the shielded receive cavity, which samples echoes from objects in the field of the sequence of electromagnetic pulses with controlled timing, in response to a receive timing signal, and generates a sample signal in response to the samples;
    wherein the transmit and receive cavities are positioned side-by-side and the transmit and receive antennas are mounted in the cavities in a substantially coplanar arrangement and extend in opposed directions;
    a timing circuit which supplies the transmit timing signal to the transmitter and supplies the receive timing signal to the receiver, the receive timing signal causing the receiver to sample the echoes such that time between transmission of pulses in the sequence by the transmitter and sampling by the receiver sweeps over a range of delays; and
    a signal processor, coupled with the receiver, to indicate a characteristic of the object in response to the sample signal.

2. A swept range gate radar for detecting characteristics of objects within a range of less than 20 feet, comprising:
    a transmitter, including a shielded transmit cavity and a transmit antenna within the shielded transmit cavity, which transmits a sequence of radio frequency (RF) pulses from the transmit antenna into the field in response to a transmit timing signal having a transmit pulse repetition rate of greater than 1 megaHertz;
    a receiver, including a shielded receive cavity, a receive antenna within the shielded receive cavity, a first sampling gate coupled to the receive antenna, a second sampling gate coupled to the receive antenna, and a differential amplifier having a first input coupled to the first sampling gate and a second input coupled to the second sampling gate, which samples echoes from objects in the field of the sequence of RF pulses with controlled timing in the first and second sample gates, in response to a receive timing signal, and generates a sample signal in response to the samples;

wherein the transmit and receive cavities are positioned side-by-side and the transmit and receive antennas are mounted in the cavities in a substantially coplanar arrangement and extend in opposed directions;

a timing circuit which supplies the transmit timing signal to the transmitter and supplies the receive timing signal to the receiver, the receive timing signal causing the receiver to sample the echoes such that time between transmission of pulses in the sequence by the transmitter and sampling by the receiver sweeps over a range of delays in a sweep cycle such that echoes are sampled at the pulse repetition rate and with different delays in the range of delays, such that the sample signal represents the received echoes in equivalent time; and a signal processor, coupled with the receiver, to indicate a characteristic of objects in the range in response to the sample signal.

3. A radar for detecting characteristics of objects within a field, comprising:

a transmitter, including a shielded transmit cavity having a transmit opening with a perimeter and facing the field, and a transmit antenna within the shielded transmit cavity, which transmits a sequence of electromagnetic signals from the transmit antenna into the field in response to a transmit timing signal, each of the signals in the sequence having a duration of about 10 nanoseconds or less;

a receiver, including a shielded receive cavity having a receive opening with a perimeter and facing the field, and a receive antenna within the shielded receive cavity, which samples echoes from objects in the field of the sequence of electromagnetic signals with controlled timing, in response to a receive timing signal, and generates a sample signal in response to the samples;

wherein the transmit and receive cavities are positioned side-by-side and the transmit and receive antennas are mounted in the cavities in a substantially coplanar arrangement and extend in opposed directions;

a shielding base, supporting the shielded transmit cavity and the shielded receive cavity such that the transmit cavity is separated from the receive cavity, and shielding receiver and transmitter electronics; and a timing circuit, shielded by the shielding base, which supplies the transmit timing signal to the transmitter and supplies the receive timing signal to the receiver, such that a sampling interval between transmission of a given electromagnetic signal in the sequence and sampling of echoes of said given electromagnetic signal has a length of less than about 300 nanoseconds.

4. The apparatus of claim 1, wherein the transmit timing signal causes the transmitter to transmit the sequence of electromagnetic pulses at a pulse repetition rate, and wherein the receive timing signal sweeps over the range of delays in a sweep cycle such that echoes are sampled at the pulse repetition rate and with different delays in the range of delays, such that the sample signal represents received echoes in equivalent time.

5. The apparatus of claim 1, wherein the receiver includes a first sampling gate coupled to the receive antenna, a second sampling gate coupled to the receive antenna, and a differential amplifier having a first input coupled to the first sampling gate and a second input coupled to the second sampling gate.

6. The radar of claim 1, wherein the timing circuit includes a voltage controlled delay circuit having a control input, and a voltage ramp generator coupled to the control input of the voltage controlled delay circuit to sweep the receive timing signal.

7. The radar of claim 6, wherein the voltage ramp generator comprises an analog exponential ramp generator, and the voltage controlled delay circuit produces a delay which is an exponential function of voltage on the control input.

8. The apparatus of claim 1, wherein the transmit antenna comprises a resistively loaded monopole antenna, and the receive antenna comprises a resistively loaded monopole antenna.

9. The apparatus of claim 1 further comprising means coupled to the receiver for reducing clutter in the sample signal.

10. The apparatus of claim 9 wherein the means for reducing clutter comprises at least one of means for decoupling the transmit cavity from the receive cavity; means for damping ringing in the receive cavity; radiative conductors extending from the receive cavity; a terminating plate coupled to the receive cavity; and a conductive damping element mounted in the receive cavity.

11. The apparatus of claim 1, wherein the transmit antenna comprises a resistively loaded monopole leaf antenna, and the receive antenna comprises a resistively loaded monopole leaf antenna.

12. The apparatus of claim 1, wherein the receive and transmit cavities are mounted side-by-side, and further comprising a double wall structure between the receive and transmit cavities, wherein the double wall structure comprises a first wall and a second wall spaced away from the first wall, the first wall providing a wall of the transmit cavity and the second wall providing a wall of the receive cavity.

13. The apparatus of claim 12 wherein the transmit and receive antennas are resistively terminated at cavity walls that are distal from the first and second walls.

14. A method for sensing characteristics of objects within a field, comprising:

transmitting a sequence of electromagnetic signals into the field from a transmit cavity with controlled timing, wherein electromagnetic signals in the sequence have a duration of about 10 nanoseconds or less, and a transmit interval between electromagnetic signals in the sequence has a length which exceeds 100 nanoseconds;

sampling, at a receive cavity adjacent the transmit cavity with controlled timing, a sequence of echoes of the sequence of electromagnetic signals reflected from objects within the field, each echo in the sequence sampled within a sampling interval of time of less than 100 nanoseconds from the time of transmission of a corresponding electromagnetic signal in the sequence; and processing the sampled sequence of echoes to indicate a characteristic of an object within the field: and further comprising:

positioning transmit and receive antennas in the transmit and receive cavities so that the electric fields are substantially parallel to the interface between the cavities.

15. The method of claim 14, including sweeping the sampling interval over a range of lengths.

16. The method of claim 15, wherein the step of processing includes sampling and holding samples of echoes in the sequence to produce a sample signal representing the sequence of sampled echoes in equivalent time.

17. The apparatus of claim 2 wherein the transmit antenna comprises a resistively loaded monopole antenna, and the receive antenna comprises a resistively loaded monopole antenna.

18. The apparatus of claim 3 wherein the transmit antenna comprises a resistively loaded monopole antenna, and the receive antenna comprises a resistively loaded monopole antenna.

19. The apparatus of claim 2 further comprising means coupled to the receiver for reducing clutter in the sample signal.

20. The apparatus of claim 3 further comprising means coupled to the receiver for reducing clutter in the sample signal.

* * * * *